United States Patent
Elad et al.

(10) Patent No.: US 7,512,558 B1
(45) Date of Patent: Mar. 31, 2009

(54) AUTOMATED METHOD AND SYSTEM FOR FACILITATING MARKET TRANSACTIONS

(75) Inventors: Joseph B. Elad, Claymont, DE (US); Apperson H. Johnson, Wilmington, DE (US); Rob T. Aulwes, Portland, OR (US); Daniel L. Chester, Newark, DE (US); David S. Cleaver, Newark, DE (US); Keith S. Decker, Hockessin, DE (US); David N. Paules, Wilmington, DE (US); Thomas A. Pelaia, Newark, DE (US)

(73) Assignee: Quantum Leap Research, Inc., Claymont, DE (US)

( * ) Notice: Subject to any disclaimer, the term of this patent is extended or adjusted under 35 U.S.C. 154(b) by 522 days.

(21) Appl. No.: 09/846,121

(22) Filed: Apr. 30, 2001

Related U.S. Application Data

(60) Provisional application No. 60/201,693, filed on May 3, 2000.

(51) Int. Cl.
*G06Q 40/00* (2006.01)
(52) U.S. Cl. .................. 705/37; 26/80; 26/27; 26/10
(58) Field of Classification Search .............. 705/37, 705/26, 80, 27, 10; 273/272
See application file for complete search history.

(56) References Cited

U.S. PATENT DOCUMENTS

| | | | |
|---|---|---|---|
| 3,581,072 A | 5/1971 | Nymeyer | 235/152 |
| 5,195,172 A | 3/1993 | Elad et al. | 706/62 |
| 5,414,838 A | 5/1995 | Kolton et al. | 707/104.1 |
| 5,428,712 A | 6/1995 | Elad et al. | 706/46 |
| 5,446,885 A * | 8/1995 | Moore et al. | 707/103 R |
| 5,960,407 A | 9/1999 | Vivona | 705/10 |
| 6,012,046 A * | 1/2000 | Lupien et al. | 705/37 |
| 6,038,554 A | 3/2000 | Vig | 705/400 |
| 6,131,087 A | 10/2000 | Luke et al. | 705/26 |
| 6,141,653 A * | 10/2000 | Conklin et al. | 705/80 |
| 6,151,589 A | 11/2000 | Aggarwal et al. | 705/37 |
| 6,167,564 A * | 12/2000 | Fontana et al. | 717/104 |
| 6,236,977 B1 * | 5/2001 | Verba et al. | 705/10 |
| 6,584,451 B1 * | 6/2003 | Shoham et al. | 705/37 |
| 6,892,185 B1 * | 5/2005 | Van Etten et al. | 705/27 |

OTHER PUBLICATIONS

Saeed Samiee "Customer Evaluation of Products in a Global Marke"; Journal of International Business Studies, vol. 25, No. 3. (3rd Qtr., 1994), pp. 579-604.*

(Continued)

*Primary Examiner*—Harish T. Dass
(74) *Attorney, Agent, or Firm*—Gomez International Patent Office, LLC

(57) ABSTRACT

The present invention relates to a method for finding the best match between buyers (or buyers consortiums) and sellers (or sellers consortiums), by a set of software intermediaries, and for using the information developed in those matches to define monetary and performance commitments between parties, and to create fair distribution of the benefits of the agreement among the respective participants. The system solves three related optimization problems concurrently: the optimal aggregation of individual buyers into buyers consortiums; the optimal aggregation of individual sellers into sellers consortiums, and the optimal match of requirements, posed by the buyers consortium, to offers, posed by the sellers consortium.

56 Claims, 18 Drawing Sheets

| | Buyer | | Seller | | | Excess Value |
|---|---|---|---|---|---|---|
| | A | B | A | B | | |
| Amperes | 60 | 50 | 50 | 60 | | |
| Res. Value | $65.00 | $50.00 | $40.00 | $50.00 | | |
| Marginal Value | $1.08 | $1.00 | $0.80 | $0.83 | | |
| | | | | | | |
| BuyerA/SellerA | $54.17 | | $40.00 | | | $14.17 |
| BuyerB/SellerB | $50.00 | | $50.00 | | | $0.00 |
| | | | | | Total | $14.17 |
| | | | | | | |
| BuyerA/SellerB | $65.00 | | $50.00 | | | $15.00 |
| BuyerB/SellerA | | | | | | $10.00 |
| | | | | | Total | $25.00 |
| | | | | | | |
| | | | | | | Match Value |
| | | | | | | $10.83 |

OTHER PUBLICATIONS

Foundation for Intelligent Physical Agents, *FIPA ACL Message Structure Specification*, FIPA Geneva http://www.fipa.org/specs/fipa00061/XC00061D.pdf, 2000.

Raiffa, H., *The Art and Science of Negotiation*, 1982, pp. 288-297.

Bichler, M., *An experimental Analysis of Multi-Attribute Auctions*, 2000, pp. 249-268.

Sandholm, T., Suri, S., *Market Clearability*, 2001, pp. 217-219.

Thomas R. Gruber; "A Translation Approach to Portable Ontology Specifications," Knowledge Systems Laboratory Technical Report, Apr. 1993; 23 pages.

* cited by examiner

FIG. 1

|  | Buyer | | Seller | | | Excess Value |
|---|---|---|---|---|---|---|
|  | A | B | A | B | | |
| Amperes | 60 | 50 | 50 | 60 | | |
| Res. Value | $65.00 | $50.00 | $40.00 | $50.00 | | |
| Marginal Value | $1.08 | $1.00 | $0.80 | $0.83 | | |
|  | | | | | | |
| BuyerA/SellerA | $54.17 | | $40.00 | | | $14.17 |
| BuyerB/SellerB | $50.00 | | $50.00 | | | $0.00 |
|  | | | | | Total | $14.17 |
|  | | | | | | |
| BuyerA/SellerB | $65.00 | | $50.00 | | | $15.00 |
| BuyerB/SellerA | | | | | | $10.00 |
|  | | | | | Total | $25.00 |
|  | | | | | | |
|  | | | | | | Match Value |
|  | | | | | | $10.83 |

FIG. 2

| Feature | Importance | Satisfaction | Source |
|---|---|---|---|
| Maximum Operating Temperature | 1 | 0 at 140F<br>0.5 at 180F<br>1 at 200F | Operating Specs |
| Maximum Operating Temperature | 1 | 0 at 0F<br>0.5 at -25 F<br>1 at -35F | Operating Specs |
| Nominal Voltage | 1 | 1 at 12<br>0 otherwise | Operating Specs |
| Generated Amps @ 2000 RPM, 100F | 1 | 0 at 45<br>0.5 at 70<br>1 at 78 | Operating Specs |
| Refurb/Replace overnight US&CA | 2 | 0 at 0 years<br>.5 at 3 years<br>1 at 5 years | Warranty |
| Manufacturer | 2 | 1 at Autolite, Delco<br>0 otherwise | Agreement |
| Diodes | 1 | 1 at 200V rating<br>0 otherwise | Operating Specs |
| Price/Unit | 2 | 1 at $0<br>0 at $115 | Agreement |
| Delivery | 1 | 1 at 6 days<br>0.5 at 12 week<br>0 at 21 weeks | Agreement |
| Qty | 1 | 1 at 50<br>0.5 at 57<br>0 at 45 | Agreement |
| Special | 2 | 20 units/month | Agreement |
| Protocol | 1 | 1.0 at Dutch<br>0.7 at Vikery<br>0.5 at English | Negotiation |
| Expiration | 5 | 1 at 2001/01/01<br>0 at 2001/01/03 | Negotiation |

FIG. 3

| Feature | Importance | Satisfaction | Source |
|---|---|---|---|
| Maximum Operating Temperature | 1 | 0 at 140F<br>0.5 at 180F<br>1 at 200F | Operating Specs |
| Maximum Operating Temperature | 1 | 0 at 0F<br>0.5 at -25 F<br>1 at -35F | " |
| Nominal Voltage | 1 | 1 at 12<br>0 otherwise | " |
| Generated Amps<br>@ 2000 RPM, 100F | 1 | 0 at 50<br>0.5 at 72<br>1 at 78 | " |
| Refurb/Replace<br>US | 2 | 1 at 2 years<br>0.5 at 1 year<br>0 at 0 years | Warrantee |
| Manufacturer | 2 | 0 at unknown<br>0.5 at Tier 2<br>0.7 at Tier 1<br>1 at Autolite, Delco | Identity |
| Diodes | 1 | 1 at 200V rating<br>0 otherwise | " |
| Price/Unit | 2 | 1 at $0<br>0 at $110 | Preference |
| Delivery | 1 | 1 at 8 days<br>0.5 at 18 days<br>0 at 21 days | Preference |
| Qty | 1 | 1 at 15<br>0 otherwise | Preference |
| Protocol | 1 | any | Preference |
| Expiration | 2 | 1 at 2001/01/01<br>0 at 2001/01/05 | Preference |

FIG. 4

| Feature | Value | Source |
|---|---|---|
| Maximum Operating Temperature | 150 | Operating Specs |
| Maximum Operating Temperature | -11 | " |
| Voltage | 12 | " |
| Generated Amps @ 2000 RPM, 100F | 60 | " |
| Manufacturer | Delco | Identity |
| Diodes | 200v | " |
| North America Warrantee | $0 @ 1 yr $8 @ 5 years | Agreement |
| Price/Unit | $100 @ 10 $98 @ 25 $93 @ 50 | " |
| Delivery | 5 days | Agreement |
| Qty | 10-300 | Agreement |
| Protocol | Vikery | Agreement |
| Special | Flexible Delivery | Agreement |

FIG. 5

| Feature | Value | Source |
|---|---|---|
| Maximum Operating Temperature | 160 | Operating Specs |
| Maximum Operating Temperature | -15F | " |
| Voltage | 12 | " |
| Generated Amps @ 2000 RPM, 100F | 65 | " |
| Manufacturer | Tier1 | Identity |
| Diodes | 100V Standard 200V Special (+ $8/Unit) | " |
| US Warrantee | 1 yr | Agreement |
| Price/Unit | $90 | " |
| Delivery | 7 days | Agreement |
| Qty | 20-200 | Agreement |

FIG. 6

| Feature | Value | Source |
|---|---|---|
| Refurb/Replace Overnight US & Mexico Warranty | 3 yr | Agreement |
| Price/Unit | $5 + 0.5% of unit price | " |
| For Manufacturer | Tier1, Autolite, Delco | " |
| Manufacturer | Tier1 | Identity |

FIG. 7

| Feature | Value | Source |
|---|---|---|
| Refurb/Replace overnight CA Warranty | 4 yr | Agreement |
| Price/Unit | $4 + 0.5% of unit price | " |
| For Manufacturer | Tier1, Autolite, Delco | " |
| Manufacturer | Tier2 | Identity |

FIG. 8

```
<termsheet>
 <owner>BuyerA3</owner>
 <feature>
  <name>amps</name>
  <importance>1</importance>
  <satisfaction>logistic,10,amps|0.0,40|0.5,55|1,60|</satisfaction>
 </feature>
 <feature>
  <name>qty</name>
  <importance>1</importance>
  <satisfaction>logistic,15,qty|0.0,20|0.5,22|1,23|</satisfaction>
 </feature>
 <feature>
  <name>SellerRating</name>
  <importance>1</importance>
  <satisfaction>logistic,15,SellerRating|0.0,0.5|0.5,0.8|1,1|</satisfaction>
 </feature>
 <feature>
  <name>Warranty</name>
  <importance>1</importance>
  <satisfaction>linear,1,Warranty|0.0,0|0.5,1|1,3|</satisfaction>
 </feature>
 <feature>
  <name>price</name>
  <importance>2</importance>
  <satisfaction>linear,0,price|0.0,100|0.5,50|1,0|</satisfaction>
 </feature>
</termsheet>
```
— 801

```
<offersheet>
 <owner>SellerA3</owner>
 <protocol>split</protocol>
 <feature>
  <name>amps</name>
  <value>60</value>
 </feature>
 <feature>
  <name>qty</name>
  <value>33</value>
 </feature>
 <feature>
  <name>Warranty</name>
  <value>3</importance>
 </feature>
 <feature>
  <name>price</name>
  <value>50</value>
 </feature>
 <feature>
  <name>SellerRating</name>
  <value>1.0</value>
 </feature>
</offersheet>
```
— 802

FIG. 21

```
<marketsheet>
<dealsheet>
  <seller>SellerA3</seller>
  <qty>23</qty>
  <strike-price>75.000000</strike-price>
  <buyer>BuyerA3</buyer>
  <feature> <name>amps</name>
     <value>60.000000</value>
     <satisfaction>1.000000</satisfaction>
     <marginal>6.250000</marginal>
  </feature>
  <feature> <name>qty</name>
     <value>23.000000</value>
     <satisfaction>1.000000</satisfaction>
     <marginal>6.250000</marginal>
  </feature>
  <feature> <name>SellerRating</name>
     <value>1.000000</value>
     <satisfaction>1.000000</satisfaction>
     <marginal>6.250000</marginal>
  </feature>
  <feature> <name>Warranty</name>
     <value>3.000000</value>
     <satisfaction>1.000000</satisfaction>
     <marginal>6.250000</marginal>
  </feature>
  <feature> <name>price</name>
     <value>75.000000</value>
     <satisfaction>0.250000</satisfaction>
     <marginal>25.000000</marginal>
  </feature>
  <excess>
    <total>1150.000000</total>
    <buyer>575.000000</buyer>
    <seller>575.000000</seller>
  </excess>
</dealsheet>
  <excess>1150.000000</excess>
</marketsheet>
```

FIG. 22

| From | To | Message | FIPA message | Example Message |
|---|---|---|---|---|
| Buyer/Seller | CFA | Register | request | (request)<br>:sender Buyer/Seller<br>:receiver CFA<br>:content (<unknown>) |
| Buyer/Seller | CFA | Term Sheet | cfp | (cfp)<br>:sender Buyer/Seller<br>:receiver CFA<br>:content (<term sheet>) |
| Buyer/Seller | CFA | Retract Term Sheet | cancel | (cancel)<br>:sender Buyer/Seller<br>:receiver CFA<br>:content (<term sheet>)<br>:ontology <ontology |
| Buyer/Seller | CNA | Accept Deal | accept-proposal | (accept-proposal)<br>:sender Buyer/Seller<br>:receiver CNA<br>:content (<deal sheet>)<br>:in-reply-to <proposal |
| Buyer/Seller | CNA | Reject Deal | reject-proposal | (reject-proposal)<br>:sender Buyer/Seller<br>:receiver CNA<br>:content (<deal sheet>)<br>:in-reply-to <proposal |

FIG. 23

| From | To | Message | FIPA message | Example Message |
|---|---|---|---|---|
| CFA | Buyer/Seller | Market Marginal Value Functions | inform | (inform)<br>:sender CFA<br>:receiver Buyer/Seller<br>:content (<marginal market values>) |
| CFA | CNA | Create coalition - joint and independent. term sheets | request | (request)<br>:sender CFA<br>:receiver CNA<br>:content (<joint term sheet<br><term sheet ...>>) |
| CFA | CNA | Retract Term Sheet | cancel | (cancel)<br>:sender CFA<br>:receiver CNA<br>:conversation-id <conv. id > |

FIG. 24

| From | To | Message | FIPA message | Example Message |
|------|-----|---------|--------------|-----------------|
| CNA | Buyer/Seller | Deal Sheet | propose | (propose)<br>:sender    CNA<br>:receiver    Buyer/Seller<br>:content    (<deal sheet>)<br>:in-reply-to <request<br>:ontology    <ontology ><br>:language    <language > |
| CNA | Buyer/Seller | Success | inform | (inform)<br>:sender  CNA<br>:receiver  Buyer/Seller<br>:content  (<deal sheet>) |
| CNA | Buyer/Seller | Failure | failure | (failure)<br>:sender  CNA<br>:receiver  Buyer/Seller<br>:content  (<deal sheet ><br>                <reasons>) |
| CNA | CFA | last words - failure | failure | (failure)<br>:sender  CNA<br>:receiver  CFA<br>:content  (<joint term sheet ><br>                <reasons>) |
| CNA | CFA | last words - success | inform | (inform)<br>:sender  CNA<br>:receiver  DBA<br>:content  (<joint term sheet>) |
| CNA | DBA | Term Sheet | cfp | (cfp)<br>:sender  CNA<br>:receiver  DBA<br>:content  (<term sheet> |
| CNA | DBA | Retract Term Sheet | cancel | (cancel)<br>:sender    CNA<br>:receiver    DBA<br>:conversation-id    <conv. id > |
| CNA | DBA | Reject Deal Sheet | accept-proposal | (accept-proposal)<br>:sender    CNA<br>:receiver    DBA<br>:content    (<deal sheet>)<br>:in-reply-to  <proposal |
| CNA | DBA | Accept Deal Sheet | reject-proposal | (reject-proposal)<br>:sender    CNA<br>:receiver    DBA<br>:content    (<deal sheet>)<br>:in-reply-to  <proposal> |

FIG. 25

| From | To | Message | FIPA message | Example Message |
|---|---|---|---|---|
| DBA | CNA | Deal Sheet | propose | (propose)<br>   :sender DBA<br>   :receiver CNA<br>   :content (<deal sheet>)<br>   :in-reply-to <request><br>   :ontology <ontology><br>   :language <language> |
| DBA | CNA | Deal Acceptance | inform | (inform)<br>   :sender DBA<br>   :receiver CNA<br>   :content (<deal sheet>) |
| DBA | CNA | Deal Failure | failure | (failure)<br>   :sender DBA<br>   :receiver CNA<br>   :content (<deal sheet> <reasons>) |
| DBA | CNA | Deal Retraction | cancel | (cancel)<br>   :sender DBA<br>   :receiver CNA<br>   :conversation-id <conv. Id> |

AUTOMATED METHOD AND SYSTEM FOR FACILITATING MARKET TRANSACTIONS

This application claims the benefit of U.S. Provisional Application 60/201,693 filed May 3, 2000.

TECHNICAL FIELD OF THE INVENTION

The present invention relates generally to the field of automated entity, data processing, and data communications applications and more specifically to a system for automatically constructing agreements between buyers and suppliers.

BACKGROUND OF THE INVENTION

In many cases, there is a complex relationship between the features of a good or service, and a buyer's satisfaction with those goods or services. Often, there is no way to find the combination of suppliers, goods, and services, which will best meet an identified need. In these cases, buyers may consult vendors (who are likely to give self-serving assessments of the best match) or independent experts (who, if they are truly independent, have no power to commit vendors to specific performance, and who, though expert, cannot hope to stay perpetually aware of all of the combinations of goods and services which may be offered in the marketplace.) Since it is impossible for buyers to do a complete job of surveying the market place for the best buy, the best fit, or the best set of collaborators to aid in achieving a better negotiating position, and since the cost of performing a due-diligence assessment of alternatives rises sharply with the complexity and number of features considered, buyers often limit their consideration to just a few choices, often buying "packages" that are far from ideal for their needs. Conversely, the lack of buyer selectivity encourages sellers to bundle goods or services in such a way that no individual buyer is optimally satisfied, but the average dissatisfaction of buyers is minimized. The object of the present invention is to permit buyers to exercise greater specificity and selectivity in obtaining goods or services, and simultaneously, for sellers to gain a higher value from the goods or services they offer. It is acknowledged that, initially at least, corporate buyers and sellers may not entrust all negotiations entirely to a software system; even in the case of "human in the loop" negotiations, however, the system will provide tremendous benefit by identifying the top alternatives, portraying the tradeoffs among alternatives, and by providing the software infrastructure to allow users a spectrum of interaction levels from totally manual to totally automatic.

Several attempts have been made at creating a system for matching orders, buyers and sellers and determining market values. For example, U.S. Pat. No. 3,581,072 to Nymeyer discloses a digital computer that matches orders and establishes market prices in an auction market. In Nymeyer, price is the only transaction criteria used to determine compatibility of offers. Nymeyer not does it supply a representation for stating customer's satisfaction levels with possible states of attributes of the product, and fails to provide mutual selection of market properties such as length of offer and protocol as an attribute of the specification. Luke also fails to construct consortia that would gain better prices or valuations, and contains no mechanism to match attributes via inference.

U.S. Pat. No. 6,131,087 to Luke, et al. describes a method for matching and near-matching buyers and sellers, and uses an upper lower and preferred point along each dimension to find solicitations with matching preferred points. Luke is inferior to the current invention in that it does not permit the richness of utility function representation, nor does it support optimal assignments of the whole market, as each offering is considered individually. Luke also fails to provide selection of market properties such as length of offer and protocol as an attribute of the specification. Luke also fails to construct consortia that would gain better prices or valuations, and contains no mechanism to match attributes via inference.

U.S. Pat. No. 5,960,407 to Vivona describes a system for estimating price characteristics of a product from advertisements. It does not use information about successful or feasible transactions in optimal market assignments to inform the price estimate, nor does it supply a representation for stating customer's satisfaction levels with possible states of attributes of the product. Vivona discloses no mechanism for market matching, or automation of market negotiations or transactions.

U.S. Pat. No. 5,414,838, to Kolton, et al. describes a system for extracting historical market data, but does no prediction, and suffers all of the same weaknesses as Vivona.

U.S. Pat. No. 6,038,554 to Vig describes a system to find the market values of "anything or anybody". Vig is inferior in that it is only concerned with the societal monetary value of entities, rather than the particular (different) valuation that each individual accords a given good. Like Vivona, Vig does not use information about successful or feasible transactions in optimal market assignments to inform the value estimate. Vig also fails to disclose a mechanism for market matching, or automation of market negotiations or transactions.

U.S. Pat. No. 6,151,589 to Aggarwal, et al. discloses a method for performing online auctions and negotiations between buyer and seller. This method is inferior to the present invention in that Aggarwal is suitable only for continuous selling of identical commodities, while the present invention permits markets to be formed a periodically, at mutual demand of buyers and sellers, and supports the automated matching and negotiation for unique offerings or combinations of offerings, using protocols that are mutually specified by buyers and sellers. Aggarwal also fails to construct consortia that would gain better prices or valuations, and contains no mechanism to match attributes via inference.

Therefore, it would be desirable to create a system and method for automatically finding the most advantageous matches between one or more buyers and one or more suppliers of products and services, for negotiating among market participants and for transacting agreements based on those matches, and for using the data from those agreements as a source of market intelligence.

SUMMARY OF THE INVENTION

The present invention provides a method for automatically finding the best matches between buyers' requests and sellers' offerings in a market, for communicating those matches and for executing commitments based on those matches. Specifically, the present invention provides a method of facilitating market transactions comprising:

(a) creating a buyers abstract representation of at least one attribute of a request, and the relationship between at least one utility of the request and at least one state of the at least one attribute;

(b) creating a sellers abstract representation of at least one attribute of an offer, and the relationship between the total price of the offering and at least one state of the at least one attribute;

(c) computing a rating for overall satisfaction of the at least one attribute of a request with respect to a given offer;

(d) determining the quantity and identity of assignments of sellers' offerings to buyers' requests that produces the best set of matches for a given market; and (e) signaling that the quantities and identities of assignments are accepted and that the transaction is committed by buyers and sellers.

The present invention also provides A computer system for automatically finding the best matches between buyers' requests and sellers' offerings in a market, for communicating those matches, and for executing commitments based on those matches, comprising:

(a) a buyer's abstract representation of at least one attribute of a request, and the relationship between at least one utility of the request and at least one state of the at least one attribute;

(b) a seller's abstract representation of at least one attribute of an offer, and the relationship between the total price of the offering and at least one state of the at least one attribute;

(c) means for computing a rating for overall satisfaction of the at least one attribute of a request with respect to a given offer;

(d) means for determining the quantity and identity of assignments of sellers' offerings to buyers' requests that produces the best set of matches for a given market; and (e) means for signaling that the quantities and identities of assignments are accepted and that the transaction is committed by buyers and sellers.

The present invention also provides several things that are necessary to aid both buyers and sellers to achieve the best agreements. These include:

1. A standard way of representing the diverse requirements of buyers in terms of utility to the buyer.
2. A standard way of representing the diverse features of an offering, in terms of fixed and differential charges by the seller.
3. A method of aggregating buyers individual requirements, forming a buyers consortium, to achieve greater purchasing power, and to take advantage of opportunities for complementation.
4. A method of aggregating individual sellers, forming a sellers consortium, to achieve to take advantage of opportunities for complementation.
5. A method of finding best matches among sets of representations of requirements and representation of offerings.
6. A method of automatically negotiating, to refine the match between buyers and sellers.
7. A method of fairly distributing the goods or services among the members of the buyers consortium.
8. A method of fairly distributing the payments among the members of the sellers consortium.
9. A way of preserving levels of buyer and seller anonymity during negotiations.
10. A method applying digital signatures and timestamps at each phase of the transaction, so no party to the agreement can deny the information that they have supplied to the system.
11. A system to monitor the content of negotiated agreements, to infer the marginal values of features from historical transactions, and to report those marginal values as a paid service to prospective buyers and sellers.

BRIEF DESCRIPTION OF THE DRAWINGS

FIG. 1 is an example of value of better matching, Buyers A,B, Sellers A,B

FIG. 2 is an example, termsheet for an for an alternator—Buyer A1

FIG. 3 shows a termsheet for an for an alternator—Buyer B1

FIG. 4 shows an offersheet for an for an alternator from Seller A2

FIG. 5 shows an offersheet for an for an alternator from Seller B2

FIG. 6 shows an offersheet for an for an alternator warranty from Seller C2

FIG. 7 shows an offersheet for an for an alternator warranty from Seller D2

FIG. 8 shows a concatenated termsheet, offersheet—Buyer A3, Seller A3

FIG. 21 shows a Marketsheet, containing Dealsheet for Buyer A3, Seller A3

FIG. 22 shows Buyer/Seller messages

FIG. 23 shows Coalition Formation Agent (CFA) {either BCA or SCA} messages

FIG. 24 shows Coalition Negotiation Agent (CNA) {either BNA or SNA} messages FIG. 25 shows Deal Broker Agent (DBA) messages

DETAILED DESCRIPTION OF THE INVENTION

Figure 9:
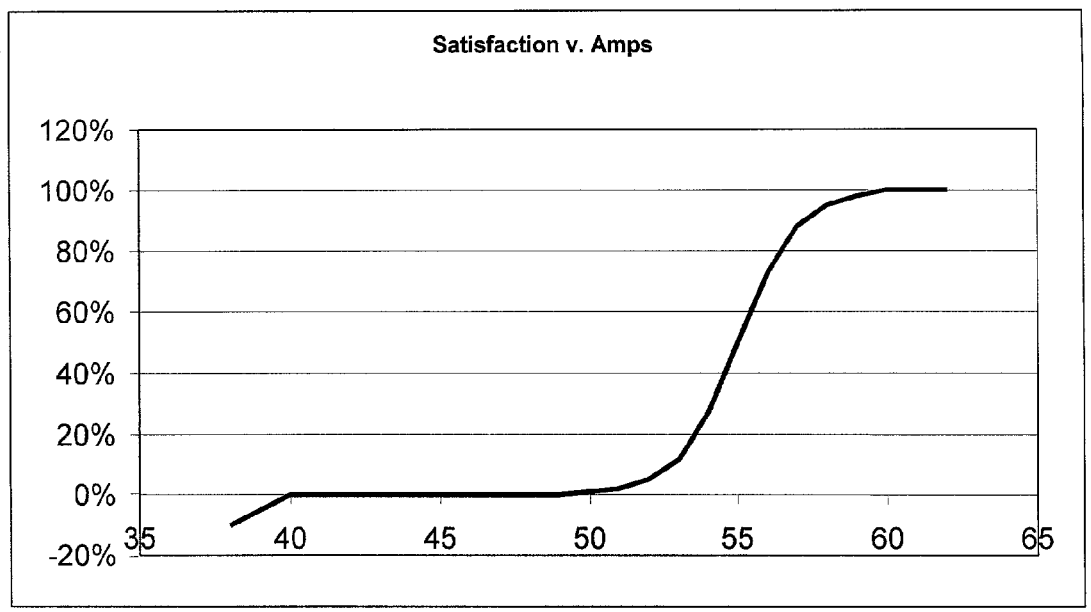
FIG. 9 shows a graph representing Satisfaction v. Amps, Buyer A3

The present invention is based upon the desire to create a system and method for automatically finding the most advantageous matches between one or more buyers and one or more suppliers of products and services, for negotiating among market participants and for transacting agreements based on those matches, and for using the data from those agreements as a source of market intelligence. In order to clearly convey the invention, the concept of excess value, methods of representing buyer's preferences, methods of representing the features of seller's goods or services, and a method for computing the excess value of a particular set matches of seller's goods or services to buyers are described. A list of examples of the corporate entities that would be potential users of the invention is also provided.

Examples of methods to represent buyers' preferences and valuation of complex products that are described by multiple features are then described. The description covers how these representations may be evaluated to determine the dollar (or any desired currency) equivalent value of various states of features, the overall satisfaction of the buyer with a given product, and the excess value, which is the value he ascribes to the product above its price. This valuation method can be used to compare alternative potential transactions, and provides a mechanism by which maximizing the excess value of the set of possible transactions in the marketplace yields the most efficient outcome for the community of buyers and sellers.

The construction of a computer system for automatically encoding the representations of buyer's preferences and seller's offerings, using this data to build effective consortia for the economic benefit of their constituents, providing a mechanism for the buyer's consortia to find the products that are most satisfying to them, and providing a mechanism for sellers to find those buyers who ascribe the highest value to their offerings is also provided.

The elements of the invention are then summarized, the potential buyer and seller strategies are presented as well as the rationale that would direct buyers and sellers to enter system data honestly, thereby increasing its effectiveness, and increasing the system's attractiveness other buyers and sellers.

The concept of excess value is used in constructing the present invention. Mathematician Hugo Steinhaus has proposed a fair-division procedure to promote an "envy-free" way to divide some benefit. As explained in Howard Raiffa's "The Art and Science of Negotiation: "As long as individuals place different values on a good, there will be a positive total excess to an efficient distribution, this excess can be divided among the participants." Clearly, a buyer and seller must value some good differently, or no sale is possible. Just as clearly, better matches of a seller's offerings to a buyer's needs produce more efficient distributions.

FIG. 1 presents an example where Buyer A wishes to buy a single 60 Amp alternator, and is willing to pay $65, and finds only one seller A, offering a 50 Amp alternator for $40. Another buyer B desires a 50 Amp alternator, and is willing to pay $50 for it, but may only have access to seller B, who is offering 60 Amp alternators for $50. Clearly, neither buyer is as satisfied as he could be, given better knowledge if the marketplace and the sum of all sellers' total profit is also reduced. Taking $/Amp as the buyer's perceived marginal value of alternators, and comparing excess value for {BuyerA/SellerA, BuyerB/SellerB} transactions with that of {BuyerA/SellerB, BuyerB/SellerA} transactions, we calculate the value of better matching to be $10.83, or 43% of the total $25.00 excess value of optimal transactions. This is an indication of the value of specificity in the buyer's request and the seller's offering.

The present invention comprises a system and method that helps to identify, negotiate, and transact agreements between buyers and sellers. The instant invention can accomplish this while taking into account at least one attribute of an offer and a request and the relationship between quantity, price and states of the attribute. The system may be used interactively, or automatically. The system may require human confirmation prior to committing to a purchase or sale, or it may make those commitments automatically, if requested to do so. More specifically, the present invention contemplates a system and method which allows buyers to create abstract statements of their needs, and allows sellers to create abstract statements of their offers. This invention also contemplates systems that use optimization, heuristic rules, or search techniques to create consortiums of buyers and/or sellers, and to identify the best matches of sets of offerings to sets of needs, and to determine fair prices paid by buyers or buyers consortia to sellers or sellers consortia, and to determine optimal distributions of goods to buyers and fair distribution of payments to sellers.

The following example is presented to more clearly show preferred aspects of the invention and is not intended to be limiting in any way. In the example presented, we are concerned with two buyers who seek to purchase alternators meeting a given specification, and a warranty or maintenance contract that will cover use of the alternators in a given set of geographic areas, for a prescribed length of time. Also, in the example, we consider sellers who sell the physical alternators, and other sellers who sell maintenance on alternators.

In all of the discussion that follows the "buyer" refers to a buying entity, regardless of whether that entity is an individual or a company, and the "seller" refers to a selling entity, regardless of whether that entity is an individual or a company. Multiple buyers may also be construed to be a single buyer seeking multiple independent agreements, and Multiple sellers may be construed to be a single seller seeking multiple independent agreements. We define a "good" as any product or service that would be paid for by its recipient. For the purposes of the example, a company that might purchase alternators and warranties is Bombardier of Québec, Canada. An example of a company which might offer such alternators is Ac Alternator & Auto Electric of Fullerton, Calif. An example of a company, which might provide warranties is Warranty Direct of Uniondale, N.Y.

One of the underlying aspects of the present invention is the representation of product features and value. These representations are contained in a termsheet and an offersheet. In the present invention, it is important to create an abstract representation of the goods that are desired by a buyer. A termsheet is a document which contains a list of features regarding the specifications and value (to the buyer) of goods or services, including but not limited to: physical specifications; performance criteria; states of compatibility with other goods; states of conformance to standards; sets of allowed or preferred sellers; third party ratings or characterization of the sellers, times, quantities; prices. Also included in the termsheet is an indication of what negotiating protocols are permitted for the purpose of gaining an agreement, and the expiration date, beyond which the buyer is no longer interested in using the invention to transact a purchase. Each feature has a label, an importance level—which indicates its weight relative to other features considered, and a satisfaction function that relates a description of states of the good with the degree of satisfaction with that particular feature. An optional field, source, indicates where information about this feature is likely to be found or specified. FIG. 2 and FIG. 3 are examples of termsheets for two buyers.

In FIG. 2, a buyer seeks to purchase 50 Alternators, at $115 or less, with a warranty covering the US and Canada for 5 years, seeking delivery in 6 days, and allowing the system until Jan. 3, 2001 to find the best agreement. A "special" clause states that the buyer can take delivery at a rate of 20 units per month.

FIG. 3 demonstrates a case in which a buyer seeks 15 alternator, for up to $110, warranted for 1 year in the US, allowing the system until Jan. 5, 2001 to find the best deal.

In addition to creating a termsheet, an offersheet should be created. An offersheet is a document which contains a list of features and specifications of goods or services offered by its owner, including but not limited to: physical specifications; performance criteria; states of compatibility with other goods; states of conformance to standards; sets of allowed or preferred sellers; third party ratings or characterization of the sellers, times, quantities; prices, and price functions. An offersheet may also include satisfaction functions that measure the suitability of a buyer (e.g. Seller satisfaction v. Dun & Bradstreet Commercial Credit Score percentile). Also included in the offersheet is an indication of what negotiating protocols that are permitted for the purpose of gaining an agreement, and the expiration date, beyond which the seller is no longer interested in using the invention to transact a sale.

FIGS. 4, 5, 6, and 7 illustrate offersheets constructed by Sellers A2, B2, C2, and D2, respectively. FIG. 4 shows the offersheet of a supplier who is selling 60 Amp alternators, offering a North America warrantee for 1 year warranty, or for an extra $8, for 5 years, and charging between $93 and $100 per unit, depending on quantity.

FIG. 5 illustrates the offersheet of a supplier who is selling 65 Amp alternators, offering a US warrantee for 1 year, and charging between $90 per unit. He also offers an option of heavy-duty 200 Volt diodes, for an extra $8 per unit. FIG. 6 shows the offersheet of a provider who offers warranty service throughout the US and Mexico, on several brands of Alternator. FIG. 7 demonstrates the offersheet of another warranty provider, who provides coverage in Canada for alternators made by tier 2 manufacturers.

Termsheet and offersheet information may be transmitted among software agents in many different ways such as SQL statements, FIPA messages, KQML messages, or encoded as XML data, as illustrated in FIG. 8, which depicts a concatenation of a termsheet for Buyer A3, and an offersheet for Seller B3; this is the most trivial and basic input for the deal synthesis agent (module 1711 of FIG. 17), in the preferred embodiment, termsheets, offersheets, and the resulting marketsheets are represented as XML data within FIPA messages. A market sheet, which is composed of zero or more dealsheets, is shown in FIG. 21. This is the market sheet representing the deal synthesis of a deal between Buyer A3 specified in 801 of FIG. 8, and Seller A3, specified in 802 of FIG. 8.

Within the termsheet, some of the relationships between states and degree of satisfaction are binary. For example, in FIG. 2, the requirement that the manufacturer be Autolite or Delco. In many cases, however, a more-or-less continuous function maps feature states to satisfaction. Many functions may be used in this mapping, including cubic splines, look-up tables, and other numeric functions that compute utility with respect to a given attribute's states.

Figure 14:
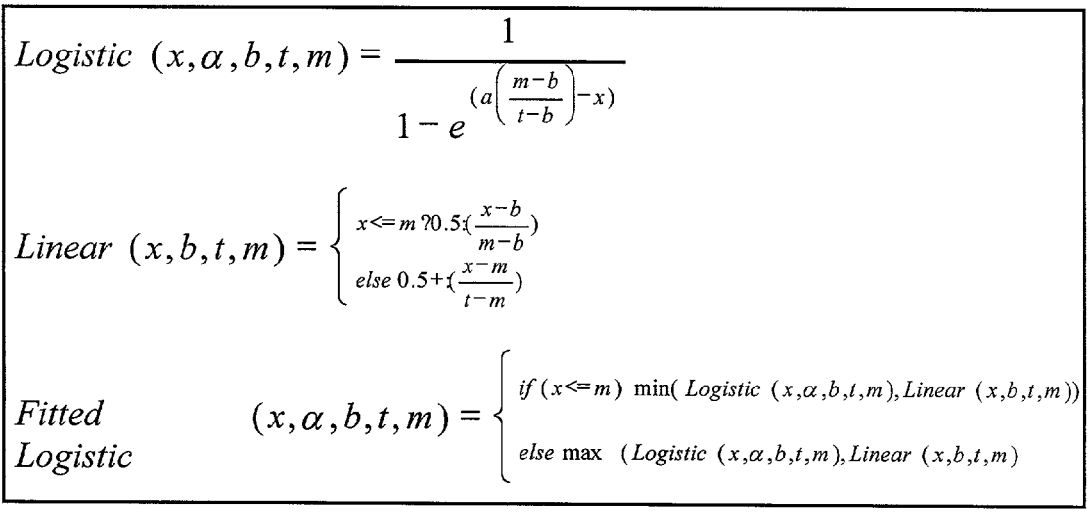
FIG. 14 shows Satisfaction Functions
Figure 15:
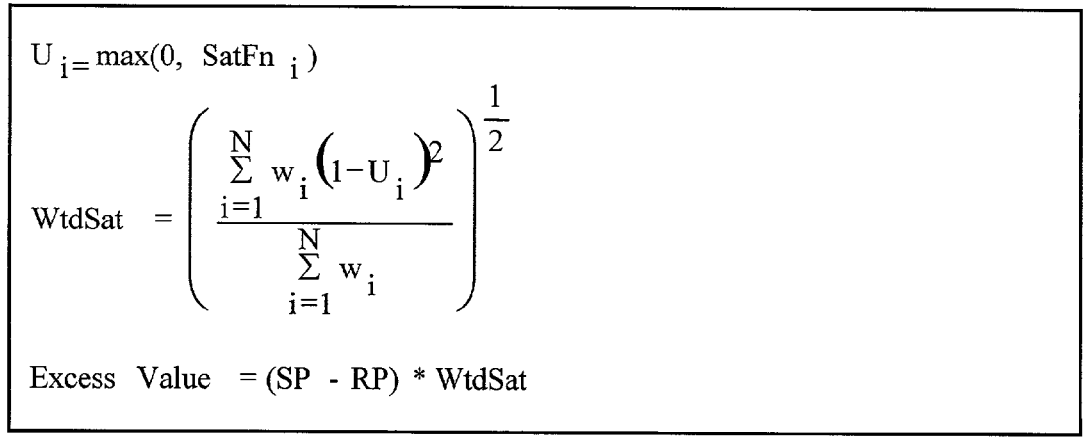
FIG. 15 shows Combining weighted Satisfaction Functions
Figure 17:
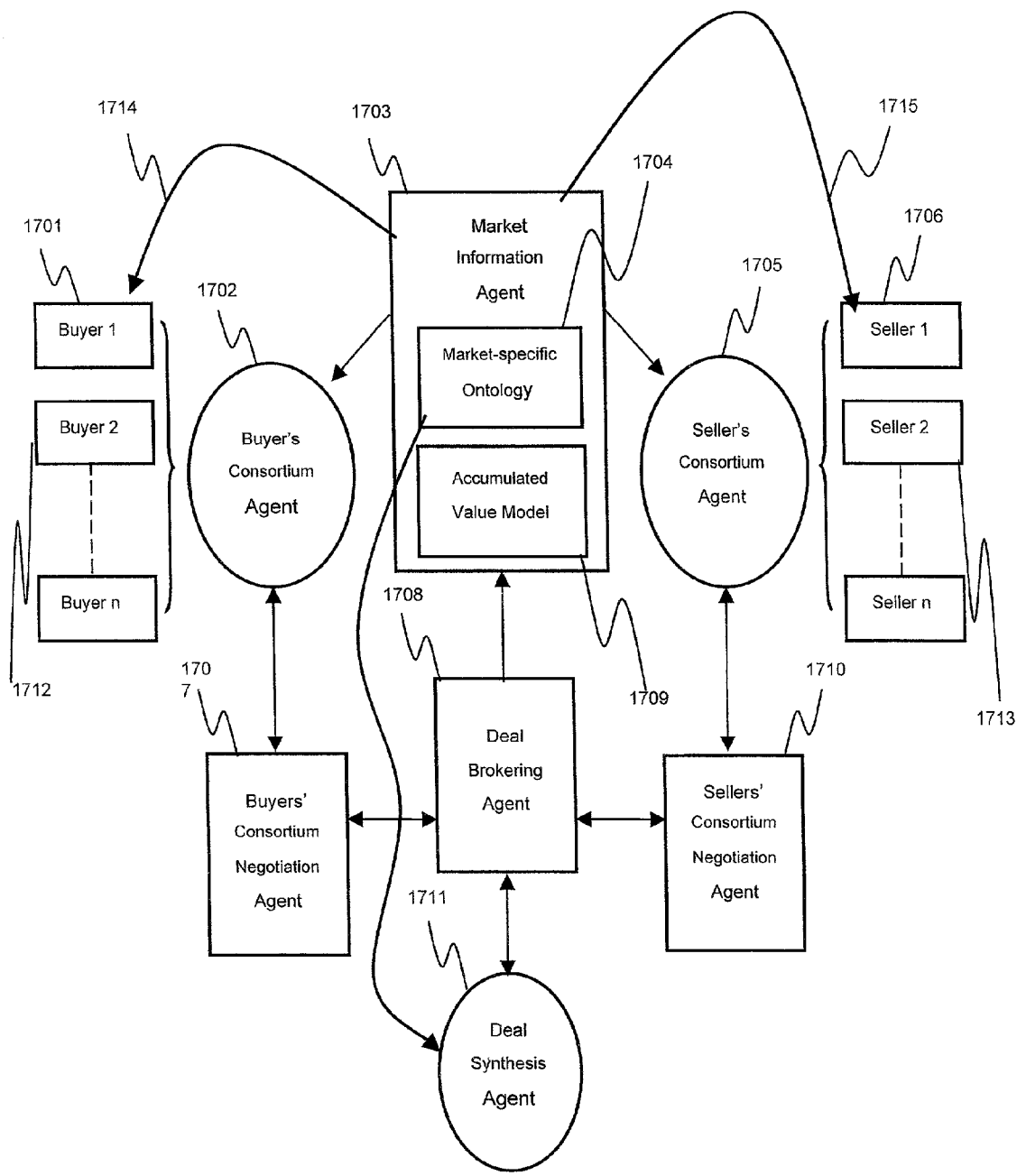
FIG. 17 shows a flow chart of Corporate and Software entities involved in agreement negotiation

Two particularly useful functions in this capacity are the piece-wise linear function and the fitted logistic function. FIGS. 9, 10, 11, 12, and 13 demonstrate mappings of feature domain states into satisfaction values, FIG. 14 demonstrates formulae for these mapping functions, and FIG. 15 demonstrates a formula for computation of overall satisfaction with a set of attributes. FIG. 17, reference 1711 depicts the Deal Synthesis Agent, which treats the maximization of the Market value as a generalized optimization problem, and creates the identities and quantities of the assignments that correspond to that maximum. FIGS. 18 to 25 refer to the messages and data that signal the assignments and quantities and acceptance thereof. In FIG. 14, and in the discussion that follows, b represents the bottom of the range of acceptable values, m represents the midpoint, and t represents the top value, beyond which the buyer would pay no additional money for increased satisfaction. FIG. 14 shows a formulation of a logistic satisfaction function, a 3-point piece-wise linear function, and a fitted logistic satisfaction function, which is similar in shape to the logistic function, but guaranteed to cross the x axis at b, and have a value of 1 at t. For the logistic function, and extra parameter $\alpha$, determines the slope of the function near the midpoint.

FIG. 9 demonstrates a fitted logistic function, relating the satisfaction of Buyer A3 (from termsheet 801 in FIG. 8) to various Amp values. This function uses information from the termsheet in FIG. 8: $\alpha=20$, $b=40$, $m=55$, and $t=60$, which represents a relationship in which Buyer A3 is unsatisfied below 40 amps, half satisfied at 55 amps, and totally satisfied at 60 amps. Additionally, the function demonstrates "saturation" of the amps requirement, soon after the midpoint is crossed. A high value of $\alpha$ results in a sudden transition from (relative) dissatisfaction to satisfaction, while a low value, as exemplified in FIG. 11, produces a more gradual curve.

Figure 10:
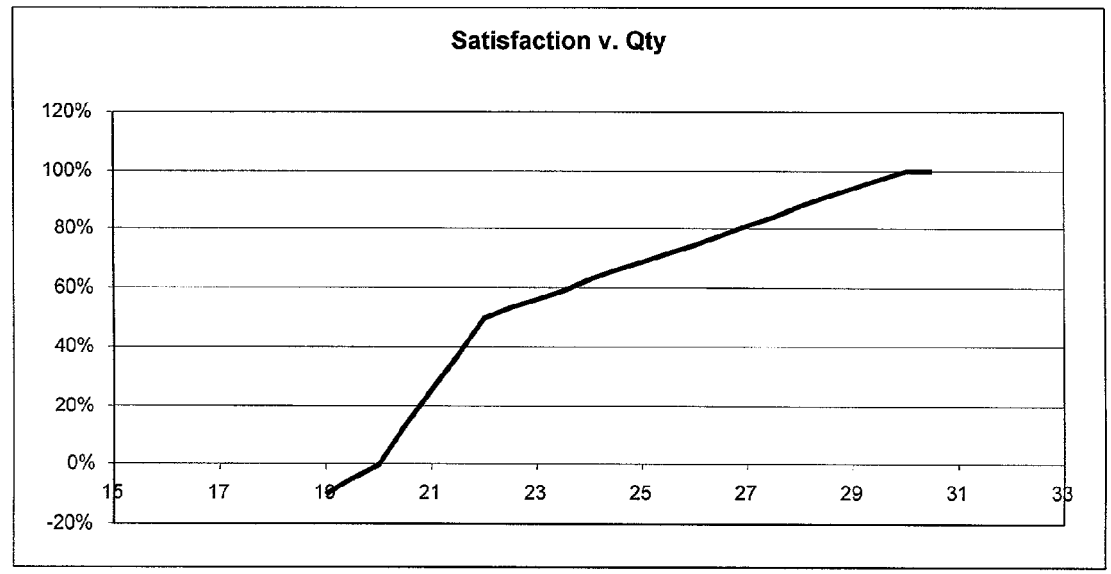
FIG. 10 shows a graph representing Satisfaction v. Qty, Buyer A3

FIG. 10 demonstrates a piecewise linear function, relating the satisfaction of Buyer A3 (from the termsheet in FIG. 8) to various Qty values. This function uses information from the termsheet in FIG. 8: $b=20$, $m=22$, and $t=30$, which represents a relationship in which Buyer A3 is unsatisfied below 20 items, half satisfied at 22 items, and totally satisfied at 30 items.

Figure 11:
FIG. 11 shows a graph representing Satisfaction v. Seller-Rating, Buyer A3

FIG. 11 demonstrates a fitted logistic function, relating the satisfaction of Buyer A3 (from the termsheet in FIG. 8) to various SellerRating values. This function uses information from the termsheet in FIG. 8: $\alpha=5$, $b=0.1$, $m=0.3$, and $t=1$, which represents a relationship in which Buyer A3 is unsatisfied below a SellerRating of 0.1, half satisfied at a rating of 0.3, and totally satisfied at a rating of 1.

Figure 12:
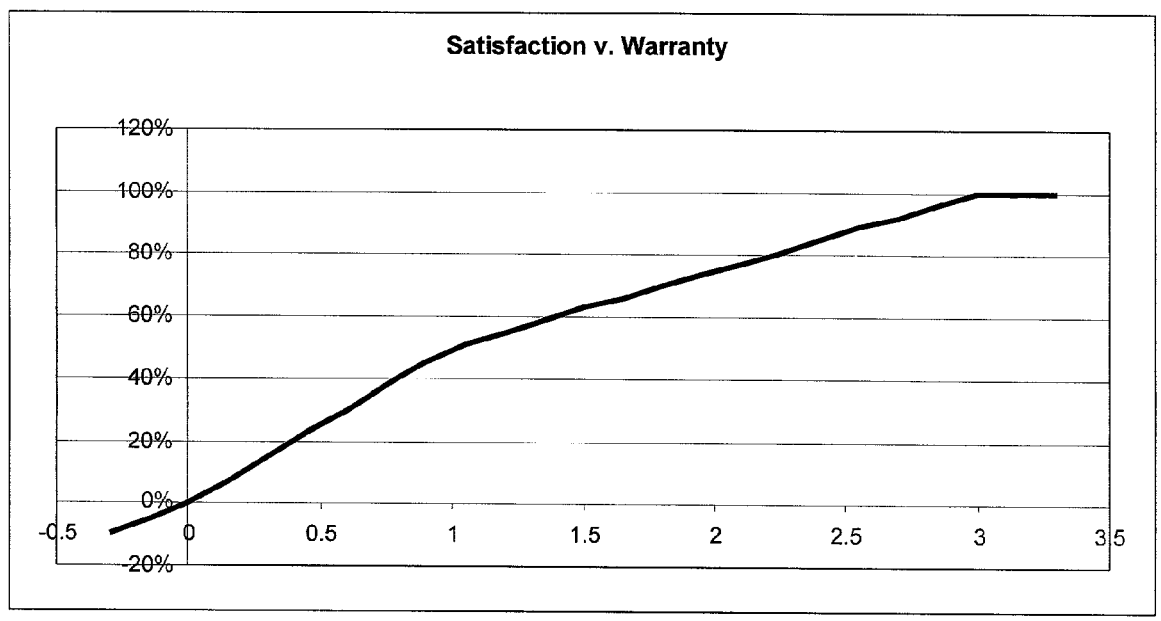
FIG. 12 shows a graph representing Satisfaction v. Warranty, Buyer A3

FIG. 12 illustrates a piecewise linear function, relating the satisfaction of Buyer A3 (from the termsheet in FIG. 8) to various Warranty values. This function uses information from the termsheet in FIG. 8: $b=0$, $m=1$, and $t=3$, which represents a relationship in which Buyer A3 is half satisfied with a 1 year warranty, and totally satisfied with 3 years.

Figure 13:
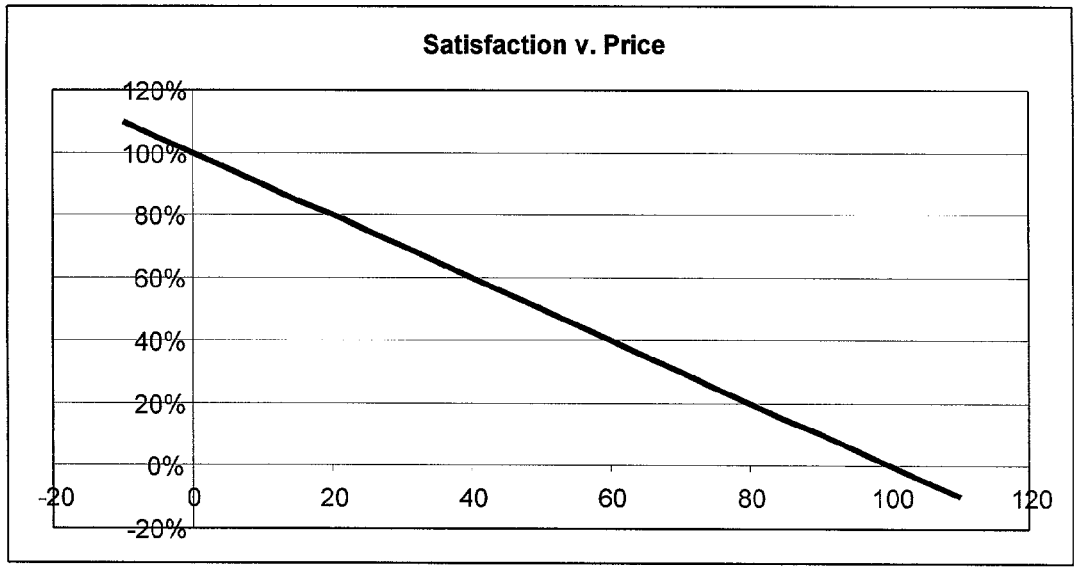
FIG. 13 shows a graph representing Satisfaction v. Price, Buyer A3

FIG. 13 Illustrates a piecewise linear function, relating the satisfaction of Buyer A3 (from the termsheet in FIG. 8) to various Price values. This function uses information from the termsheet in FIG. 8: $b=100$, $m=50$, and $t=0$, which represents a relationship in which Buyer A3 is willing to spend between $0 and $100 per alternator.

The interpretation of the continuous functions is as follows: the piecewise linear function indicates separate, unrelated ranges where satisfaction grows incrementally with some underlying value. Logistic functions portray a single continuous range of satisfaction. These functions permit a great variety of expressions of the buyer's utility, while requiring few parameters. It is obvious that other mapping functions could also be employed to relate feature states to degree of satisfaction, including, but not limited to: step-functions, singly inflected functions, linear and non-linear regression functions, splines, and arbitrary polynomial functions stating or approximating user satisfaction over some of a range of states of a given feature. Such functions may be derived by buyers, by using statistical, machine-learning, or other analytic techniques to determine the value of various feature states, or may be drawn from existing bodies of consumer or engineering or scientific knowledge.

In a preferred embodiment, suitable domain-specific mapping functions would be offered as defaults, users could choose alternatives visually by selecting curves such as those in FIGS. 9, 10, 11, 12, and 13 from a menu, and modifying those curves via data or sliding visual buttons. Also, in the preferred embodiment, the price satisfaction function will be distinguished from all others, in that it is required to be linear, continuous, and extend infinitely in both directions, as shown in FIG. 13. In the preferred embodiment, the price per unit at 0% satisfaction of FIG. 13 is typically regarded as the reservation price at complete satisfaction, above which the buyer is disinterested in buying. This price is particularly important, as it also establishes way to scale each of the other features, and to apply a single quantitative value to a given potential agreement, and to calculate equitable distribution of excess value in a transaction. We will refer to this price as the Buyers Reservation Price (BRP). The meaning of this representation is that the buyer would be willing to pay, at most, $100 for a product with which they were completely satisfied. The same buyer would not be willing to pay any money for a product that provided no satisfaction. Assuming that a dollar over any interval of satisfaction has the same value the Buyer, we can draw equivalence between various states of satisfaction and the amount a buyer would be willing to spend. Additionally, taking the value of all dollars to be equivalent for all buyers and sellers, we have constructed a way of determining the excess value of an entire set of potential transactions.

In this invention, it is important to create an abstract representation of the goods that are offered by a seller. An offersheet is a list of features regarding the specifications of that good, including but not limited to: physical specifications; performance measurements, compatibility with other goods; statements of conformance to standards; sets of allowed or preferred buyers; third party ratings or characterization of the buyers, times, quantities; prices. Also included in the offersheet are an indication of what negotiating protocols are permitted for the purpose of gaining an agreement, and the expiration date, beyond which the seller is no longer interested in using the invention to transact a sale. Each feature of an offersheet has a label, a value that describes a state or cost of the feature, and a source that indicates the domain in which the feature is found. The same functions that are used to represent the relationship between the satisfaction of a request with states of an attribute may be used to represent the relationship between the price of the offer and at states of an attribute of the offer.

For any given transaction, the sellers price from the seller's offersheet corresponding to the parameters of the proposed transaction is the price typically regarded as the reservation price, below which the seller is disinterested in selling. This price, which will be referred to as the Sellers Reservation Price (SRP) is central to establishing the quantitative value of a given potential transaction to the seller, and is used, along with the BRP, to calculate equitable distribution of excess value in a transaction.

FIG. 14 demonstrates how a logistic, linear, and fitted logistic function, each relating satisfaction to some underlying variation of a given feature, might be calculated. Note that other functions might certainly be used in this capacity, these particular ones are chosen to functions to supply the greatest expressive power, while minimizing the number of parameters required of the user. Starting with the level of satisfaction from some function in FIG. 14, the formulas in FIG. 15 demonstrate the calculation of dissatisfaction $U_i$ with a given feature, and total weighted satisfaction, WtdSat features of a given product, as perceived by a buyer. In the preferred embodiment, the feature of price is not included in this calculation. The dollar-equivalent of satisfaction can be calculated by equating the total satisfaction level with the corresponding segment of the satisfaction v. price curve (FIG. 13). This method of calculating over-all satisfaction is similar to Yager's T-Norm for combining values of fuzzy sets, and represents a compromise between using maximum dissatisfaction (the standard fuzzy-logic conjunction operator) and average dissatisfaction. Alternative approaches include use of weighted fuzzy-logic conjunction operators, weighted geometric means, weighted arithmetic means, and use of a weighted combination, with the weights derived via analytic hierarchy analysis.

Figure 16:
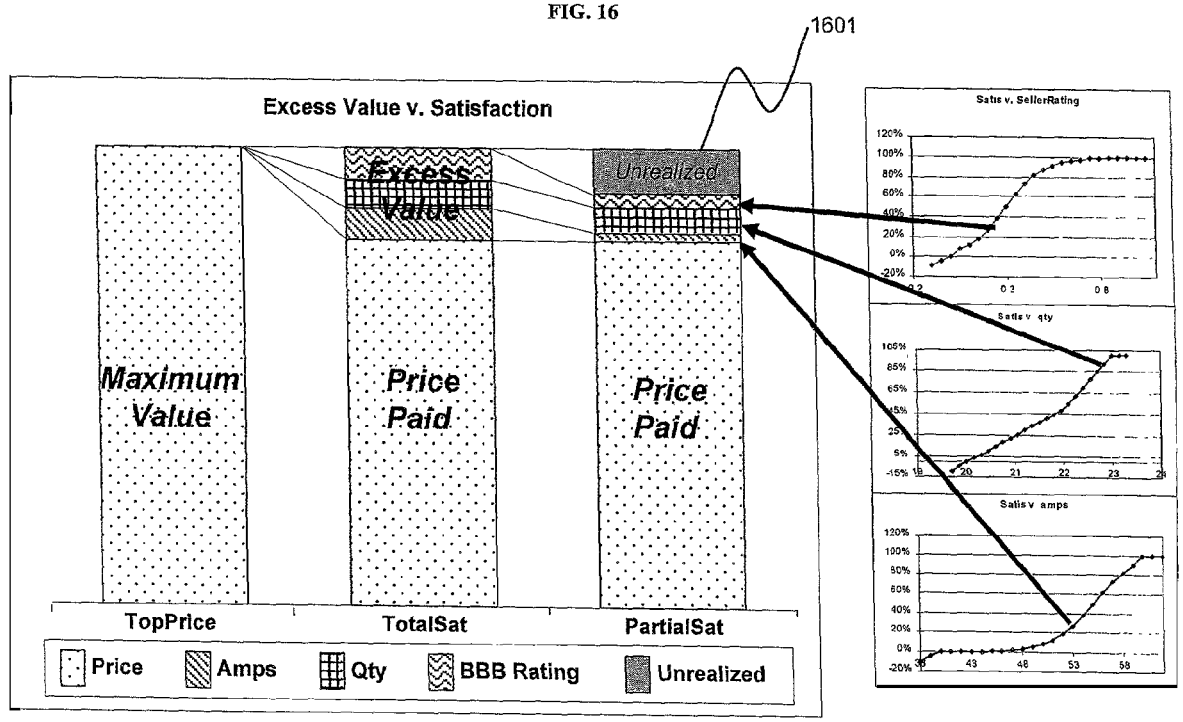
FIG. 16 shows Maximum value, excess value, total, and partial satisfaction

FIG. 16 demonstrates the relationship of excess value, the BRP, the Strike price, and unrealized value (box 1601)—which is that portion of the difference in BRP and the Strike Price which is removed from excess value, due to the incomplete satisfaction of the Buyer's satisfaction criteria. In the TotalSat column, the price paid is less than the top price, and all features are at maximum satisfaction, thus, the entire difference in prices is excess value. In the PartialSat column, satisfaction is incomplete (corresponding to levels on the satisfaction graphs shown on the right hand side of the figure) and thus, some of the potential excess value is unrealized. Note that it is immaterial where the strike price comes from. In fact, in the preferred embodiment, calculation of the Strike-Price depends on the protocol (mutually but independently chosen by the buyer and seller)—Common protocols are advertisement,—where the seller's price is fixed, and split— where the buyer and seller split the difference between their respective reserve values.

The calculation of excess value for a unit is summarized as follows:
1. Calculate the level if satisfaction with each feature
2. Calculate the weighted satisfaction for the goods or services under consideration.
3. Calculate the excess value, by equating the level of satisfaction with the amount of money that the buyer would be willing to pay to achieve that level, and applying that to any savings that the buyer realizes versus the strike-price of the deal.

The total excess value for a market is simply the excess for each unit, for each agreement in that market.

In a preferred embodiment, the software system used to represent and communicate buyers and sellers views of the transaction, to find the transactions which maximize the markets excess value, and to provide a means for automatically or interactively achieving agreements to the proposed transactions, and to preserve requisite privacy, anonymity, and legitimacy of market participants, is built using a methodology known as a multiagent system. Multiagent systems are an approach to software architectures that support intelligent interaction, scaleability, and robustness, while permitting relatively independent development of component software modules. Rather than function-call relationships between modules, message-passing conversations are the customary way to describe interaction. Each individual agent is capable of responding to a variety of messages, creating agendas to achieve plans, and executing as variety of tasks to achieve those plans. Available architectures supporting such multi-agent systems include: DECAF, Zeus, and FIPA-OS. The system also exploits optimization modules capable of optimizing an arbitrary composition of non-linear functions of discrete variables. In the preferred embodiment, these modules use the Quantum Leap Problem Solving Engine to find best solutions quickly, but other approaches to optimization might also be used, including, but not limited to: heuristic search, numeric optimization, genetic algorithms, mixed integer programming, simulated annealing, dynamic programming, MonteCarlo and quasi-MonteCarlo methods, interval methods, Lagrangian relaxation methods, meta-genetic algorithms, differential genetic programming, sequential linear approximation, sequential quadratic approximation, constraint propagation methods, gradient methods, enumeration, parallel execution of optimization techniques, and interleaved execution of techniques.

FIG. 17 demonstrates the architecture of the invention. The present invention contemplates the cases where at least one module of the entire system is specialized for each different market. Module 1701 is an interface for an individual buyer. This buyer constructs a termsheet, which module 1701 signs with the buyer's identifier and sends to the Buyer's Consortium Agent (1702.) The Buyer's Consortium Agent (BCA) collects sheets from various buyers until some market criterion is reached. In the preferred embodiment, several alternative criteria are available: first, consortia may be constructed periodically, on a pre-set schedule; second, consortia may be constructed when the population of participating buyers reaches some predetermined threshold; third, the consortium agent may be run attempt to construct consortia as each new buyer sends his termsheet, and may use the resulting consortia plans opportunistically, when the expected excess value of the consortia reaches a particular level; forth, consortia may be constructed via a combination of any of the three previous criteria, plus an observation of the expiration time of the buyer's interest—buyers who do not have pressing expiration times may wait longer to find the ideal collaborators for a given consortium. The optimization system used in the Buyer's Consortium Agent seeks to the combinations of termsheets that will achieve the highest expected value, given a model of the valuation of products and features in the marketplace. The valuation used for this optimization will be drawn from the Market Information Agent (box 1703)—which dynamically builds, refines, and adjusts the market model from transaction data. The initial market model, may be constructed by domain experts, from their experience, and from observation 9 of the advertised prices and features of goods or services in the particular domain. In grouping multiple buyers' termsheets, the consortium agent will use the most demanding composition of individual satisfaction functions as the satisfaction function of the group. Thus, if buyer A4 mentions a feature and buyer B4 does not, then the combined termsheets will mention that feature and use the satisfaction function described by buyer A4. In the preferred embodiment, the weights of each individual buyer will be multiplied by the quantity of units they are seeking to obtain (at the 0.5 satisfaction level, when unit quantity is also a feature) and these unit-normalized weights will be assigned to the features in the combined termsheet. It should be noted that it is possible for the best set of consortiums of N buyers may be N singleton consortiums—each buyer acting alone, if there is too little commonality among their requirements; at the other extreme, all buyers termsheets may be combined, in a single consortium, if the pay-off for greater volume is high enough, as many sellers offer better prices for large volume purchases. In every case, the criteria for inclusion of buyers in a consortium is that the expected excess value of all of the consortia chosen is maximized, subject to the constraint that no member is receiving a lower expected excess value than he would acting alone. After the optimal consortia have been found, each one (consortium) is stamped with an identifier, which is used both as a proxy for each member buyer's authorization, and as a mechanism to conceal identity of the buyers. Each individual consortium termsheet is sent to a Buyers' Consortium Negotiation Agent (box 1707) who acts on behalf of the consortium in all negotiations with sellers. It should be noted that, in the preferred embodiment, there are more than one instance of the a Buyers' Consortium Negotiation Agent—running on separate processors, using separate memory, and, potentially, specializing in different segments of the market. The a Buyers' Consortium Negotiation Agent (BNA) will find the instances of Deal Brokering Agents who are most appropriate for the given goods or services, and try to achieve the best excess value that can be found among the available deals. The consortium termsheet will be transmitted from a BNA to a Deal Brokering Agent (module 1708), which will collect termsheets from various BNA instances.

Module 1706 is an interface for an individual seller. This seller constructs a offersheet, which module 1706 signs with the seller's identifier and sends to the Seller's Consortium Agent (1705.) The Seller's Consortium Agent (SCA) collects offersheets from various sellers until some market criterion is reached. In the preferred embodiment, several alternative criteria are available: first, consortia may be constructed periodically, on a pre-set schedule; second, consortia may be constructed when the population of participating sellers reaches some pre-determined threshold; third, the consortium agent may be run attempt to construct consortia as each new seller sends his offersheet, and may use the resulting consortia plans opportunistically, when the expected excess value of the offering of consortia reaches a particular level; forth, consortia may be constructed via a combination of any of the three previous criteria, plus an observation of the expiration time of the seller's interest—sellers who do not have pressing expiration times may wait longer to find the ideal collaborators for a given consortium.

The optimization system used in the Seller's Consortium Agent sees to the combinations of offersheets that will achieve the highest expected value, given a model of the valuation of products and features in the marketplace. The valuation used for this optimization will be drawn from the Market Information Agent (box 1703), which dynamically builds, refines, and adjusts the market model from transaction data. The initial market model may be constructed by domain experts, from their experience, and from observation of the advertised prices and features of goods or services in the particular domain. In the preferred embodiment, the consortium agent will group multiple sellers' offersheets to achieve the maximum expected excess value, while using the minimum of the number of units available. In cases where the features of two sellers in a consortium overlap, the most advantageous (RE excess value) combination of those features is used in the construction of the combined termsheet. It is expected that most of the value in sellers' consortiums will be achieved by complementation—i.e. two or more sellers offering non-overlapping segments of an offering which has higher value in total then would be ascribed to its parts.

It should be noted that it is possible for the best set of consortiums of N sellers may be N singleton consortiums, with each seller acting alone, if there is too little complementation among their features; at the other extreme, all sellers offersheets may be combined, in a single consortium, if the expected pay-off is great enough. In every case, the criteria for inclusion of sellers in a consortium is that the expected excess value of all of the consortia chosen is maximized, subject to the constraint that no member is receiving a lower expected excess value than he would acting alone. In fact, if the seller achieves the highest expected value by acting alone, by the optimization scheme, he becomes a member of a singleton consortium. After the optimal consortia have been found, each one is stamped with an identifier, which is used both as a proxy for each member seller's authorization, and as a mechanism to conceal identity of the sellers. Each individual consortium offersheet is sent to a Sellers' Consortium Negotiation Agent (box 1710) who acts on behalf of the consortium in all negotiations with sellers. It should be noted that, in the preferred embodiment, there is more than one instance of the a Sellers' Consortium Negotiation Agent—running on separate processors, using separate memory, and, potentially, specializing in different segments of the market. The a Sellers' Consortium Negotiation Agent (SNA) will find the instances of Deal Brokering Agents who are most appropriate for the given goods or services, and try to achieve the best excess value that can be found among the available deals. The consortium offersheet will be transmitted from An SNA to a Deal Brokering Agent (module 1708), which will collect offersheets from various SNA instances.

The Deal Brokering Agent (DBA, box 1708), as has just been mentioned, accumulates termsheets from buyers' consortia, and offersheets from seller's consortia. The DBA may use one of several protocols for determining when to send the data of potential buyers and sellers, as a concatenation of termsheets and offersheets, to the Deal synthesis Agent (module 1711): first, concatenation may be constructed periodically, on a pre-set schedule; second, it may be constructed when the population of participating buyers and sellers reaches some predetermined threshold; third, the DBA may attempt a deal synthesis s each new termsheet or offersheet becomes available, and may use the resulting deal synthesis opportunistically, when the market excess value of the optimal deals reaches a particular level; forth, consortia may be constructed via a combination of any of the three previous criteria, plus an observation of the expiration times of all parties involved. FIG. 8 shows a very simple (one buyer, one seller) example of the concatenated sheet sent to the Deal synthesis Agent (DSA). The DSA finds the sets of assignments of sellers and quantities from the offersheets to the termsheets which optimizes the total market excess value, and which does not violate any of the buyer's constraints or seller's constraints. A buyer's constraint would be violated if the seller's offering fell below an acceptable level for some desired feature. A seller's constraint would be violated if the quantity committed was greater than the amount available, or if a buyer's feature (e.g. debt rating) fell below some seller-mandated minimum. In some cases, there may not be a simple match between the features requested by buyers, and those offered by sellers. For instance, a buyer desiring a warranty that covers Canada should be able to use a warranty what covers North America. In another case, a length requirement of less than 3 cm should be satisfied by a length requirement of 1 inch. Because the labels of the features involved in these transactions should admit such equivalent matches, or covering matches (in the sense that North America covers Canada), a more complex mechanism is required than simply matching the name of a given feature. To support this functionality, the Market Information Agent (MIA module 1703) contains a market-specific ontology sub-module (1704) which can provide canonical translation of dimensions, and determine whether market features requested by the buyer are logically implied by the offerings of the seller. Some of the knowledge base of this module is universal, such as Système Internationale d'unités (SI) representation of all units, while other elements are unique to a given collection of goods or services. For instance, 12 Volts is a nominal voltage for an alternator, which may actually produce 12.8 V DC, yet 12 Volts, used in the context of semiconductor power supplies may be a much more precise term; 12.8 volts in that context might be completely unacceptable. The DSA (1711) can request canonical translation and logical equivalence of terms from the market-specific ontology sub-module (1704) in cases where features do not match on a simple name or value basis.

The DSA finds both optimal assignments (if any are feasible) and also high-scoring alternative assignments (if any are feasible), and returns these, as ranked sets of marketsheet alternatives, to the DBA. In a preferred embodiment, the optimization is accomplished by various techniques, including those disclosed by U.S. Pat. Nos. 5,195,172 to Elad et al. and 5,428,712 to Elad et al., hereby incorporated by reference. FIG. 21 shows a marketsheet, containing a dealsheet for the data offered in FIG. 8. The DBA decomposes the marketsheet to its component dealsheet agreements, and sends these to the BNA and SNA who originated the buyer side and seller side, respectively, of the agreement. In a preferred embodiment, there are at this point, a variety of different potential transaction activities, which depend on the protocols stipulated by parties to the transaction. In the case of committed protocols, buyers and sellers give full authority to their respective negotiators, to find the best deals and to commit to them. In the case of non-committed protocols, buyers and sellers may prefer to review the agreement, and reserve the right to withdraw. Further, where there are close alternatives among offerings, buyers negotiation agents may want to re-negotiate, at more price advantage to the buyer, based on the fact that they can match multiple offers. Conversely, sellers negotiation agents, who see multiple opportunities to sell all inventory at a good value, may desire to re-negotiate, at more advantage to the seller. Thus, the variety of protocols that can be used are:

1. Reviewed/Market clearing
2. Committed/Market clearing
3. Reviewed/Auction, of which there are several varieties:
   a) Descending Price
   b) Ascending Price
   c) Vikery
4. Committed/Auction, of which there are several varieties:
   a) Descending Price
   b) Ascending Price
   c) Vikery Many other methods of gaining agreement, especially in cases of contention, can be contemplated. Because the protocol is, itself, data in the system, it is relatively straightforward to extend this mechanism we describe to new protocol variants. Note that all parties involved mutually elect protocols, and that there may be an ordering of a set of desired protocols. The most effective protocols will emerge, as they compete for participants. (E.g. A seller may make an offering stipulating that he will take committed/market clearing deals first, then committed Descending Price auctions next, and finally any reviewed deal that he also interactively confirms).

After an agreement has been reached, the BNA and CNA send authorizing identifiers to the DBA, making the deal official and binding. Also, the DBA sends market activity data, the transactions that were successful, along with the dollar equivalent transaction value of various good or service features, to the Market Information agent, which uses this data to revise valuation models for this segment of the marketplace.

The Market Information Agent (box 1703) records all transactions committed. The Accumulated Value Model sub-module (box 1709) uses a variety of statistical and machine-learning techniques to construct the model that best explains the market valuation of offerings purchased in market transactions. In the preferred embodiment, the techniques used would include multivariate regression, moving average, exponential smoothing, support vector machines, neural nets, C4.5, and boosting, but any method of automatically constructing a model of market values might be employed. Volatility (expected variance) of the market will be a component of the model, as well as expected value, with respect to every feature which is encountered in successful or highly ranked transactions. The resulting models will be used by both the BCA (module 1702) and the SCA (module 1705) to estimate the likely excess values of the consortia they consider. A variant of the preferred embodiment will use information from failed transaction attempts to further inform the market model, and add value to the pure information worth of the market model. For instance, the fact that all buyer requests for a 200 Amp alternator with a 300 Amp diode always fail, might be useful information to a manufacturer of alternators.

Figure 18:
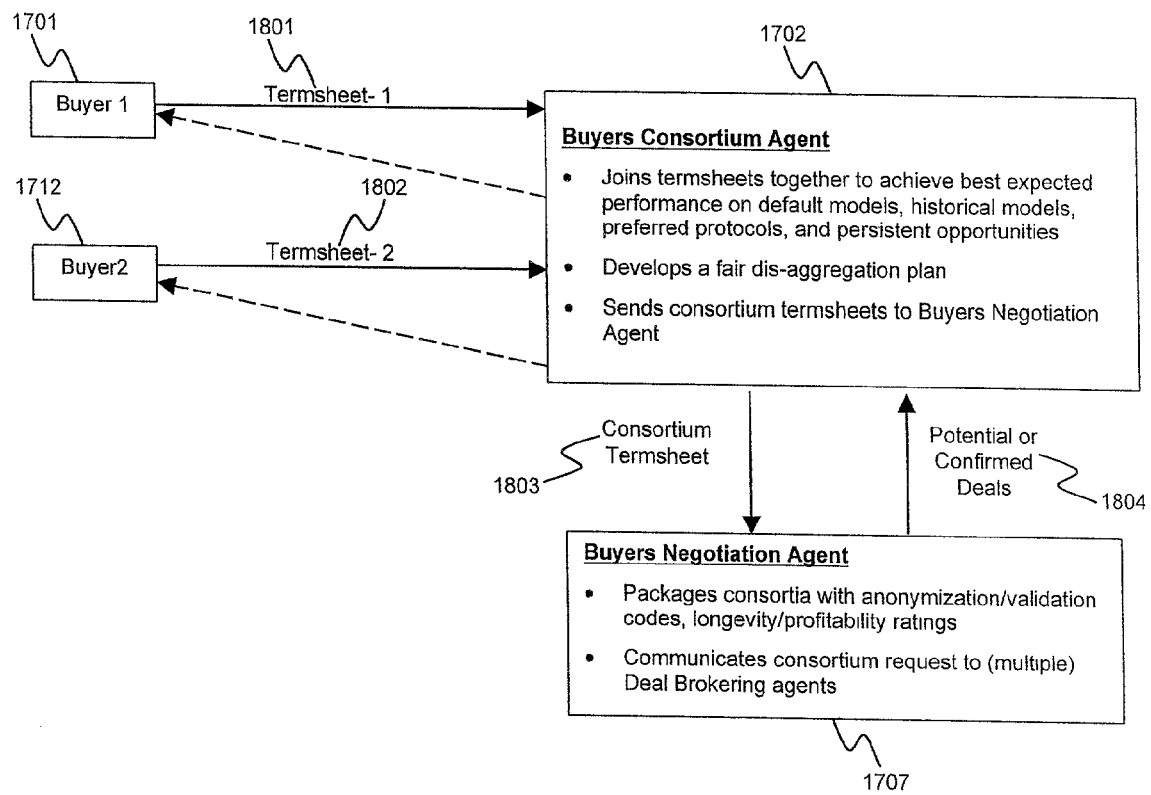
FIG. 18 shows a flow chart for a Buyers Consortium Agent
Figure 19:
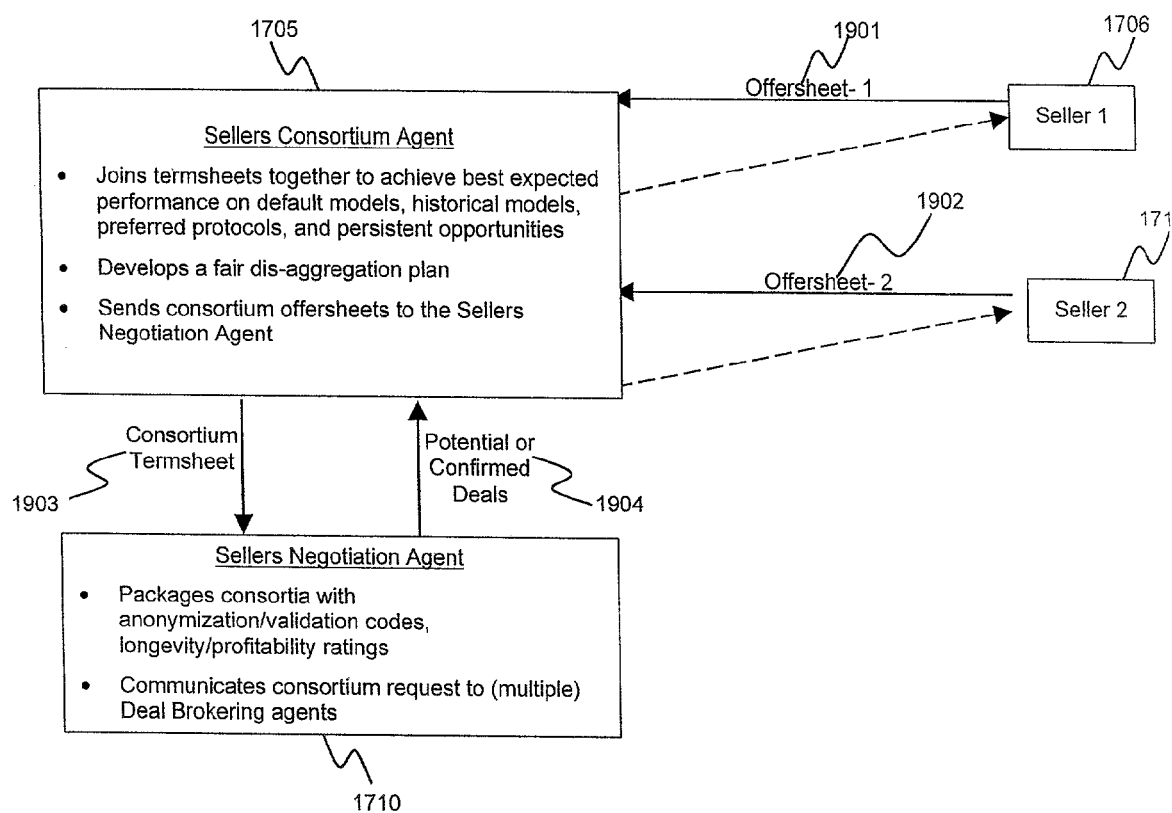
FIG. 19 shows a flow chart for a Sellers Consortium Agent
Figure 20:
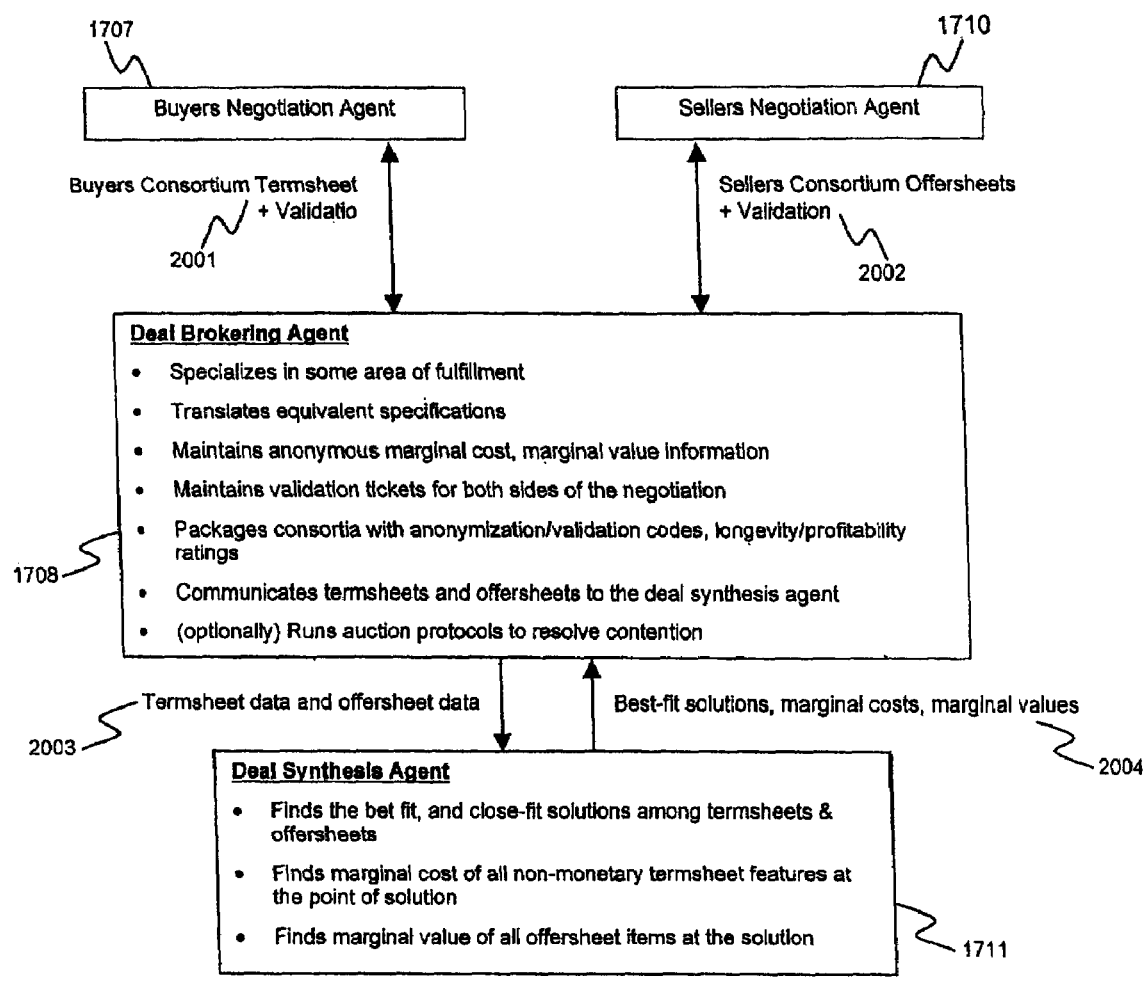
FIG. 20 shows a flow chart for a Deal Brokering Agent, Deal Synthesis Agent

FIGS. 18, 19, and 20 elaborate the interaction of the agents identified in FIG. 17. FIG. 18 Shows detailed interaction among two buyers (1701, 1712) and the BCA (1702). Buyer 1 sends Termsheet 1 (1801) to the BCA (1702). Buyer 2 sends Termsheet 2 (1802) to the BCA (1702). Using optimization methods disclosed by U.S. Pat. Nos. 5,195,172 and 5,428,712, the BCA forms the best set of consortia, and sends the consortium termsheet (1803) of one consortium to the BNA (1707), that negotiates on the behalf of that consortium. The BNA negotiates with one or more instances of the DBA (1708), who is typically a market specialist in this domain of goods or services. Potential or confirmed deals (1804) are sent back to the BCA who originated the buyer side termsheet. FIG. 19 Shows detailed interaction among two buyers (1706, 1713) and the SCA (1712). Seller 1 sends Offersheet 1 (1901) the SCA. Seller 2 sends Offersheet 2 (1902) the SCA. Using optimization methods disclosed by U.S. Pat. Nos. 5,195,172 and 5,428,712, the SCA forms the best set of consortia, and sends the consortium termsheet (1903) of one consortium to the SNA (1710), that negotiates on the behalf of that consortium. The BNA negotiates with one or more instances of the DBA (1708) for this particular domain. Potential or confirmed deals (1904) are sent back to the SCA who originated the server side offersheet. In FIG. 20, the BNA (1702) and the SNA (1710) have send their respective validated termsheets (2001) and validated offersheets (2002) to the DBA, who accumulates them, prior to communication with the running the Deal Synthesis agent (1711). When appropriate, (given the accumulation criteria) the DBA sends the concatenated termsheets and offersheets (2003) to the DSA, which finds the transactions resulting in the highest market excess value, then transmits these transactions, along with any good alternatives, back to the DBA. via a ranked set of marketsheets (2004). The DBA next decomposes the top-ranked market sheets to individual deal sheets, and sends those prospective deal sheets, either as potential deals for confirmation, or as committed deals for execution, back to the respective BNA and SNA involved. In the case of non-committed protocols, the DBA holds pending deals until it has received committed digital signatures from the buyer and seller parties involved, then transmits that commitment on to the respondents parties. Message flows 1714, 1715 represents information about the market value of various goods or services, as determined by the MIA (1703). This information may be acquired via subscription, or requested on an as-needed basis. This market information may be sold to buyers, sellers, and other interested parties. For instance, this information might be valuable to companies contemplating entry into a given market, or to securities analysts who seek to determine the economic strength of suppliers selling into the market segment involved.

FIGS. 22, 23, 24, and 25 portray the conversation among the agents listed in FIG. 17. In the preferred embodiment, the system will use FIPA messages to communicate among agents, and the data language used to represent termsheets, offersheets, marketsheets, and dealsheets is XML data representation. Many alternative message types, including KQML messages, or proprietary messages for a particular domain, might be used. Other data representations, such as SQL statements or lisp encoding might be used rather than XML.

The present invention contemplates several appealing buyer and seller strategies to assess their potential advantage in the system. One example is buyer misrepresentation. However, if a buyer misrepresented his Satisfaction v. Price relationship, he would risk loosing an advantageous deal because he was under-valuing all attributes but price. Likewise, if the buyer makes some attribute criterion more stringent than it is in reality, he will potentially pay more than necessary for satisfying goods or services. Buyers will loose in two different opportunities if they attempt to use misleading termsheets: first, they will be grouped with buyers who do not share their true valuations, secondly they will not achieve the best market matches that the system is capable of.

Like the buyers, sellers can miss opportunities by misrepresenting or overpricing their offerings. Additionally, they stand to loose good ratings by over-representing the features of their goods or services. Like the buyers, honesty is rewarded in two different arenas: that of forming sellers' coalitions, and that of determining the greatest market excess value. Misrepresentation of features or reserve prices can exclude a seller from profitable transactions in either of these venues.

For either buyers or sellers, the temptation to set a very near expiration date is possible, as they might hope to probe the current market by posing very short-lived, non-committed offers. In the long run, however, this strategy is likely to backfire, as such parties will find few opportunities for coalition, and because they are permitting little time in the CFA or DBA for accumulation, they will artificially reduce the market size and likelihood of a satisfactory match. There is likely to be very little opportunity to find an "instantaneous" market value when the market depends on the formation of consortia, the accumulation of participants, and (potential) rounds of confirmation and negotiation.

Therefore, due to the negative effects of the above mentioned strategies, the best long-term strategy, for both buyers and sellers, is to honestly value those goods or services that the buyers desire, and the sellers offer, and to accurately portray their respective time requirements.

It should be noted that honest valuation does consider market value. That is, a buyer is unlikely to set a reserve price far from the advertised prices of completely satisfactory products. Similarly, the seller is unlikely to set a reserve price far from his (elsewhere) advertised price, or those of his close competitors, though it may be advantageous to offer better deals, anonymously, to the digital marketplace, while maintaining a higher "official" price list As discussed above, the current system and method builds an abstraction of buyers desired goods or services, and of those goods and services offered by sellers. The present invention discloses that these representations may be used as a basis of building efficient Buyers' Consortia, Sellers' Consortia, and for finding the transactions which match buyers needs with sellers' goods or services to maximize the excess value of the marketplace, and how we can use the excess value calculation to compensate parties in the transaction. The present invention further discloses how agents, using robust optimization, can negotiate on behalf of their clients, and to represent them in finding the transactions that best suit their interests. The present invention further discloses how market value information, acquired as a byproduct of the operation of this system, might, itself, be sold to various interested parties. The present invention also discloses how agents can exchange information required for a deal without disclosing the identity of their clients. The present invention further discloses how use of excess value provides a computable basis for fair allocation and distribution, and that such a computation of fair allocation is an attractive feature for a market. Finally, the present invention discloses how market mechanisms and protocols can, themselves be mutual, independent choices among market participants, allowing the most efficient protocols to emerge by virtue of their demonstrated effectiveness.

Many variations of the present invention are possible once the present invention is known to those skilled in the arts and are within the spirit and scope of the present invention. Those skilled in the arts will be able to make many variations on the present invention once this invention is known to the arts.

We claim:

1. In a computer system, having one or more processors or virtual machines, one or more memory units, one or more input devices and one or more output devices, optionally a network, and optionally shared memory supporting communication among the processors, a computer implemented method for automatically finding the best matches between buyers' requests and sellers' offerings in a market of products or services, wherein such products or services are described by a plurality of arbitrary attributes, and for representing those matches in computer memory, and for communicating those matches, and for executing commitments based on those matches, said method comprising a microprocessor or virtual machine:
   (a) creating a buyers abstract representation of a plurality of intrinsic or extrinsic attributes of a request, and the relationship between at least one utility of the request and at least one state of the plurality of attributes;
   (b) creating a sellers abstract representation of a plurality of intrinsic or extrinsic attributes of an offer, and the relationship between the total price of the offering and at least one state of the plurality of attributes;
   (c) computing a rating for overall buyer's satisfaction of the plurality of attributes of a request with respect to a given offer;
   (d) determining the quantity and identity of assignments of sellers' offerings to buyers' requests, within the constraints of each party's stated extrinsic attributes, that produces the best set of matches for a given market;
   (e) capturing market data from market transactions and using the market data to automatically predict costs of attribute states in hypothetical transactions by steps comprising:
      (i) recording the request and offer data, along with the transaction price and quantity, for the committed transactions, and for other transactions that scored sufficiently well, and for requests and offers that were not matched in the market;
      (ii) inferring market value relationships from other data sources, such as sellers' advertisements, and or buyers' requests for proposals:
      (iii) using of mathematical function approximation techniques for constructing market value functions that describe the relationship between price and the states of various intrinsic or extrinsic attributes in a hypothetical market;
   (f) automatically joining buyers' requests in a consortium by steps comprising:
      (i) forming the best partition of the buyers' requests into groups or singletons of requests whose representation of attributes can be satisfied by the same seller offering:
      (ii) forming the combined abstract representation of the requests for the consortium, said representation which will satisfy each buyer in the consortium;
      (iii) constructing an artificial negotiating entity that will represent at least one consortium, and can conceal the identities of the buyers in the consortium; and
   (g) optionally signaling that the quantities and identities of assignments are accepted and that the transaction is committed by buyers and sellers.

2. The method of claim 1 wherein sellers' offerings are automatically joined in a consortium, by steps comprising a microprocessor or virtual machine:
   (a) forming the best partition of the sellers' offerings into groups or singletons of offerings which considered together achieve the highest values on hypothetical market transactions, with regard to the value functions constructed in claim 1;
   (b) forming the abstract representation of the offerings for the consortium, said representation which will represent each offer in the consortium; and
   (c) constructing an artificial negotiating entity that will represent at least one consortium, and can conceal the identities of the sellers in the consortium.

3. The method of claim 1 wherein the plurality of attributes includes both intrinsic qualities of the object of the request or offer, and extrinsic qualities of the transaction or market protocols, wherein the extrinsic attributes comprise commitment protocols and time qualifications.

4. The method of claim 3 wherein the method further comprises a microprocessor or machine:
   (a) combining abstract representations from at least two market participants, to combine maximize the combined satisfaction for the consortium of those participants; and
   (b) using buyers' consortiums rather than individual buyers and sellers' consortiums, or individual sellers, in determining the best set of matches,
   whereby a transaction can be accomplished between consortia, rather than individual buyers and sellers.

5. The method of claim 4 further comprising a microprocessor or virtual machine joining buyers' requests automatically in a consortium by:
   (a) forming the best partition of the buyers' requests into groups or singletons of requests whose representation of attributes can be satisfied by the same seller offering;
   (b) forming the combined abstract representation of the requests for the consortium, said representation which will satisfy each buyer in the consortium; and
   (c) constructing an artificial negotiating entity that will represent at least one consortium, and can conceal the identities of the buyers in the consortium;
   and automatically joining sellers' offerings in a consortium by:
   (d) forming the best partition of the sellers' offerings into groups or singletons of offerings which considered together achieve the highest values on hypothetical market transactions, with regard to the value functions constructed in claim 1;
   (e) forming the abstract representation of the offerings for the consortium, said representation which will represent each offer in the consortium; and
   (f) constructing an artificial negotiating entity that will represent at least one consortium, and can conceal the identities of the sellers in the consortium,
   and using the market value data from transactions to construct mathematical function approximations predicting the value of states of attributes for hypothetical transactions to construct a stream or compendium of market information.

6. The method of claim 5 further comprising a microprocessor or virtual machine numerically representing the determination of best assignments and quantities as an optimization problem and optimizing the assignments and quantities by finding the total of each buyer's and each seller's satisfaction with the transactions to be committed.

7. The method of claim 6 further comprises a microprocessor or virtual machine matching the plurality of attributes of a request and the plurality of attributes of an offer by inferring the match of the attribute qualities of a request which are logically implied by attribute qualities of an offer.

8. The method of claim 7 further comprising a microprocessor or virtual machine determining the quantity and identity of assignments of sellers' offerings to buyers' requests which produce the best set of feasible matches for a given market.

9. The method of claim 8, wherein the mathematical function approximation technique used to relate market value to attribute states is at least one technique selected from the group consisting of:
 (a) linear regression;
 (b) non-linear regression;
 (c) machine learning techniques;
 (d) neural nets;
 (e) polynomial approximations; and
 (f) Chebyshev approximation.

10. The method of claim 8 wherein the optimization problem is solved by at least one technique selected from the group consisting of:
 (a) heuristic search;
 (b) numeric optimization;
 (c) genetic algorithms;
 (d) mixed integer programming;
 (e) simulated annealing;
 (f) dynamic programming;
 (g) MonteCarlo and quasi-MonteCarlo;
 (h) interval methods;
 (i) Lagrangian relaxation methods;
 (j) meta-genetic algorithms;
 (k) differential genetic programming;
 (l) sequential linear approximation;
 (m) sequential quadratic approximation;
 (n) constraint propagation methods;
 (o) gradient methods;
 (p) enumeration;
 (q) parallel execution of optimization techniques; and
 (r) interleaved execution of techniques.

11. The method of claim 8 further comprising a microprocessor or virtual machine using a total market excess value as the measure of highest total market value.

12. The method of claim 8 further comprising a microprocessor or virtual machine using a multiagent system to distribute the processing across many processors and memory devices to achieve timely calculations of best assignments and quantities.

13. The method of claim 8 wherein a measure of the utility at the least one state of the plurality of attributes is used to compute a rating for the overall satisfaction of a request with respect to a given offering by using at least one technique selected from the group consisting of:
 (a) weighted fuzzy-logic conjunction operators;
 (b) weighted geometric means;
 (c) a weighted version of Yager's T-NORM;
 (d) weighted arithmetic means; and
 (e) a weighted combination, with the weights derived via analytic hierarchy analysis.

14. The method of claim 8 wherein the request and offer data, the transaction price and quantity, the committed transactions, other transactions that scored sufficiently well, and the requests and offers that were not matched in the market are made available to market participants.

15. The method of claim 8 wherein different instances of at least one module of the entire system is specialized for each different market.

16. The method of claim 8 wherein an ontology is used for inferring the match of the at least one state of a plurality of attributes of a request which is logically implied by the at least one state of a plurality of attributes of an offer.

17. The method of claim 8 wherein explicit transfer of funds is not required.

18. The method of claim 8 wherein advertisement of the availability of commitment protocols and time qualifications supported by the system leads to the market evolution of the most efficient protocols and time qualifications.

19. The method of claim 8 further comprising a microprocessor or virtual machine advertising the optimality of honest characterization of the utility of each attribute utility causing market participants to communicate an honest assessment of those utilities, thereby improving the market for both buyers and sellers.

20. The method of claim 8 further comprising a microprocessor or virtual machine invoking auction protocols when there is at least two requests per one offer or at least two offers per one request.

21. The method of claim 8 wherein the abstract representation of the relationship of the utility of an attribute of the request, is created using at least one technique selected from the group consisting of:
 (a) linear functions;
 (b) piece-wise linear functions;
 (c) logistic functions;
 (d) cubic splines;
 (e) look-up tables; and
 (f) other numeric functions that compute utility with respect to a given attribute's states.

22. The method of claim 8 wherein the abstract representation of the relationship between price of the offer and at least two states of an attribute of the offer, is created using at least one technique selected from the group consisting of:
 (a) linear functions;
 (b) piece-wise linear functions;
 (c) logistic functions;
 (d) cubic splines;
 (e) look-up tables; and
 (f) other numeric functions that compute price with respect to a given attribute's states.

23. The method of claim 8 further comprising a microprocessor or virtual machine communicating the abstract representations of requests and offerings by termsheets and offersheets, respectively.

24. The method of claim 8 further comprising a microprocessor or virtual machine describing the requests as employment positions and describing the offerings as employee attributes and compensation requirements.

25. The method of claim 8 further comprising a microprocessor or virtual machine describing the requests as tasks to be accomplished, and describing the offers as agents, people and or software, willing to accomplish those tasks.

26. A computer data processing system comprising:
 at least one processor or virtual machine; at least one memory unit; one or more input devices and one or more output devices, optionally at least one on network; optionally at least one memory shared among one or more processors; for automatically finding the best matches between buyers' requests and sellers' offerings in a market of products or services, wherein such products or services are described by a plurality of arbitrary attributes for representing those matches in computer memory, and for communicating those matches, and for executing commitments based on those matches, comprising:
 (a) a module implementing a buyer's abstract representation of a plurality of intrinsic and extrinsic attributes of a request, and the relationship between at least one utility of the request and at least one state of the plurality of attributes;

(b) a module implementing a seller's abstract representation of a plurality of intrinsic or extrinsic attributes of an offer, and the relationship between the total price of the offering and at least one state of the plurality of attributes;

(c) a module implementing a means for computing a rating for overall buyers' satisfaction of a plurality of attributes of a request with respect to a given offer;

(d) a module implementing a means for determining the quantity and identity of assignments of sellers' offerings to buyers' requests, within the constraints of each party's stated extrinsic attributes, that produces the best set of matches for a given market;

(e) a module implementing a means for capturing market value data from market transactions and using the data to automatically predict the costs of attribute states in hypothetical transactions, wherein the system further comprises:

(i) a module implementing a means for recording the request and offer data, along with the transaction price and quantity, for the committed transactions, and for other transactions that scored sufficiently well, and for requests and offers that were not matched in the market:

(ii) a module implementing a means for inferring market value relationships from other data sources, such as sellers' advertisements, and or buyers' requests for proposals;

(iii) a module implementing a means for using mathematical function approximation techniques for constructing market value functions that describe the relationship between price and the states of various attributes in a hypothetical market;

(f) a module implementing a means for automatically joining buyers' requests in a consortium, wherein the system further comprises:

(i) a module implementing a means for forming the best partition of the buyers' requests into groups or singletons of requests whose representation of attributes can be satisfied by the same seller offering;

(ii) a module implementing a means for forming the combined abstract representation of the requests for the consortium which will satisfy each buyer in the consortium;

(iii) a module implementing a means for constructing an artificial negotiating entity that will represent at least one consortium and can conceal the identities of the buyers in the consortium; and g optionally a module implementing a means for signaling that the quantities and identities of assignments are accepted and that the transaction is committed by buyers and sellers.

27. The computer system of claim 26 wherein sellers' offerings are automatically joined in a consortium, wherein the system further comprises:

(a) a module implementing a means for forming the best partition of the sellers' offerings into groups or singletons of offerings which considered together achieve the highest values on hypothetical market transactions, with regard to the market value functions;

(b) a module implementing a means for forming the abstract representation of the offerings for the consortium, said representation which will represent each offer in the consortium; and (c) a module implementing a means for constructing an artificial negotiating entity that will represent at least one consortium, and can conceal the identities of the sellers in the consortium.

28. The computer system of claim 26 wherein the plurality of attributes includes both intrinsic qualities of the object of the request or offer, and extrinsic qualities of the transaction or market protocols, and wherein the extrinsic attributes comprise commitment protocols and time qualifications within the at least one processor or virtual machine.

29. The computer system of claim 28 wherein a transaction can be accomplished between consortia, rather than individual buyers and sellers, the system further comprises:

(a) a module implementing a means for combining abstract representations from at least two market participants, to maximize the satisfaction for the consortium of those participants; and (b) a module implementing a means for regarding buyers' consortiums rather than individual buyers and sellers' consortiums, or individual sellers, in determining the best set of matches.

30. The computer system of claim 29, wherein the market value data is captured from market transactions, and used to construct market value functions to automatically predict the costs of attribute states in hypothetical transactions, and wherein buyers' requests are automatically joined in a consortium, wherein the system further comprises:

(a) a module implementing a means for forming the best partition of the buyers' requests into groups or singletons of requests whose representation of attributes can be satisfied by the same seller offering;

(b) a module implementing a means for forming the combined abstract representation of the requests for the consortium, said representation which will satisfy each buyer in the consortium; and (c) a module implementing a means for constructing an artificial negotiating entity that will represent at least one consortium, and can conceal the identities of the buyers in the consortium;

and wherein sellers' offerings are automatically joined in a consortium, wherein the system further comprises:

(d) a module implementing a means for forming the best partition of the sellers' offerings into groups or singletons of offerings which considered together achieve the highest values on hypothetical market transactions, with regard to the market value functions;

(e) a module implementing a means for forming the abstract representation of the offerings for the consortium, said representation which will represent each offer in the consortium; and (f) a module implementing a means for constructing an artificial negotiating entity that will represent at least one consortium, and can conceal the identities of the sellers in the consortium, and wherein the market value data from transactions is used to construct mathematical function approximations predicting the value of states of attributes for hypothetical transactions is used to construct a stream or compendium of market information within the at least one processor or virtual machine.

31. The computer system of claim 30 wherein the determination of best assignments and quantities is represented numerically as an optimization problem, and the assignments and quantities can be found by optimizing the total of each buyer's and each seller's satisfaction with the transactions to be committed within the at least one processor or virtual machine.

32. The computer system of claim 30 wherein the plurality of attributes of a request is matched to plurality of attributes of an offer by inferring the match of the attribute qualities of a request which are logically implied by attribute qualities of an offer within the at least one processor or virtual machine.

33. The computer system of claim 32 wherein the means of determining the quantity and identity of assignments of sellers' offerings to buyers' requests produces the best set of feasible matches for a given market within the at least one processor or virtual machine.

34. The computer system of claim 33 wherein the mathematical function approximation technique used within the at least one processor or virtual machine to relate market value to attribute states is at least one technique selected from the group consisting of:
 (a) linear regression;
 (b) non-linear regression;
 (c) machine learning techniques;
 (d) neural nets;
 (e) polynomial approximations; and
 (f) Chebyshev approximation.

35. The computer system of claim 33 wherein the mathematical function approximation technique used within the at least one processor or virtual machine to relate market value to attribute states is at least one technique selected from the group consisting of:
 (a) heuristic search;
 (b) numeric optimization;
 (c) genetic algorithms;
 (d) mixed integer programming;
 (e) simulated annealing;
 (f) dynamic programming;
 (g) MonteCarlo and quasi-MonteCarlo;
 (h) interval methods;
 (i) Lagrangian relaxation methods;
 (j) meta-genetic algorithms;
 (k) differential genetic programming;
 (l) sequential linear approximation;
 (m) sequential quadratic approximation;
 (n) constraint propagation methods;
 (o) gradient methods;
 (p) enumeration;
 (q) parallel execution of optimization techniques; and
 (r) interleaved execution of techniques.

36. The computer system of claim 33 wherein a total market excess value is used as the measure of highest total market value within the at least one processor or virtual machine.

37. The computer system of claim 33 wherein a multiagent system is used to distribute the processing across many processors and memory devices to achieve timely calculations of best assignments and quantities within the at least one processor or virtual machine.

38. The computer system of claim 33 wherein a measure of the utility of at least one state of the plurality of attributes is used within the at least one processor or virtual machine to compute a rating for the overall satisfaction of a request with respect to a given offering by using at least one technique selected from the group consisting of:
 (a) weighted fuzzy-logic conjunction operators;
 (b) weighted geometric means;
 (c) a weighted version of Yager's T-NORM;
 (d) weighted arithmetic means; and
 (e) a weighted combination, with the weights derived via analytic hierarchy analysis.

39. The computer system of claim 33 wherein the means used in determining the quantity and identity of assignments of sellers' offerings to buyers' requests within the at least one processor or virtual machine are available to market participants.

40. The computer system of claim 33 wherein different instances of at least one module of the entire system is specialized for each different market within the at least one processor or virtual machine.

41. The computer system of claim 33 wherein an ontology is used to support inference of the match of at least one state of the plurality of attributes of a request which is logically implied by at least one state of the plurality of attributes of an offer within the at least one processor or virtual machine.

42. The computer system of claim 33 wherein explicit transfer of funds is not required within the at least one processor or virtual machine.

43. The computer system of claim 33 wherein advertisement of the availability of commitment protocols and time qualifications supported by the system leads to the market evolution of the most efficient protocols and time qualifications within the at least one processor or virtual machine.

44. The computer system of claim 33 wherein advertisement of the optimality of honest characterization of the utility of each attribute utility within the at least one processor or virtual machine causes market participants to communicate an honest assessment of those utilities, thereby improving the market for both buyers and sellers.

45. The computer system of claim 33 wherein auction protocols are invoked when there are at least two requests per one offer or at least two offers per one request within the at least one processor or virtual machine.

46. The computer system of claim 33 wherein the abstract representation of the relationship of the utility of an attribute of the request is created within the at least one processor or virtual machine using at least one technique selected from the group consisting of:
 (a) linear functions;
 (b) piece-wise linear functions;
 (c) logistic functions;
 (d) cubic splines;
 (e) look-up tables; and
 (f) other numeric functions that compute utility with respect to a given attribute's states.

47. The computer system of claim 33 wherein the abstract representation of the relationship between price of the offer and at least two states of an attribute of the offer, is created within the at least one processor or virtual machine using at least one technique selected from the group consisting of:
 (a) linear functions;
 (b) piece-wise linear functions;
 (c) logistic functions;
 (d) cubic splines;
 (e) look-up tables; and
 (f) other numeric functions that compute price with respect to a given attribute's states.

48. The computer system of claim 33 wherein the abstract representations of requests and offerings within the at least one processor or virtual machine are communicated by termsheets and offersheets, respectively.

49. The computer system of claim 33 wherein requests describe employment positions and the offerings describe employee attributes and compensation requirements within the at least one processor or virtual machine.

50. The computer system of claim 33 wherein the requests within the at least one processor or virtual machine describe tasks to be accomplished, and the offers within the at least one processor or virtual machine describe agents, people and or software, willing to accomplish those tasks.

51. The computer system of claim 33 wherein the information is communicated through the internet by internet protocol messages within and among the at least one processor or virtual machine.

52. The computer system of claim 33 wherein buyers and sellers access the system via web pages, Java clients, or other executable client programs within the at least one processor or virtual machine.

53. In a computer system, having one or more processors or virtual machines, one or more memory units, one or more input devices and one or more output devices, optionally a network, and optionally shared memory supporting communication among the processors, a computer implemented method for automatically providing a market for products or services, wherein such products or services are described by a plurality of arbitrary attributes, and for constructing matches between buyers' requests and sellers' offerings, and for representing those matches in computer memory, and for maintaining the market and for executing that market and for executing commitments based on that market, said method comprising a microprocessor or virtual machine:
- (a) creating a buyer's specification of a plurality of intrinsic or extrinsic attributes of a request, including at least one attribute that represents at least one market protocol and a representation of the buyer's preference for the market protocol;
- (b) creating a seller's specification of a plurality of intrinsic or extrinsic attributes including at least one market protocol and a representation of the seller's preference for the market protocol;
- (c) constructing the at least one market where the market protocol specified by the buyer and the market protocol specified by the seller are compatible;
- (d) providing at least one executable market protocol to act in accordance with the market protocol and preference specified by the buyer and the market protocol and preference specified by the seller;
- (e) executing the market protocol;
- (f) capturing market data from market transactions and using the market data to automatically predict costs of attribute states in hypothetical transactions by steps comprising:
  - (i) recording the request and offer data, along with the transaction price and quantity, for the committed transactions, and for other transactions that scored sufficiently well, and for requests and offers that were not matched in the market;
  - (ii) inferring market value relationships from other data sources, such as sellers' advertisements, and or buyers' requests for proposals;
  - (iii) using of mathematical function approximation techniques for constructing market value functions that describe the relationship between price and the states of various intrinsic or extrinsic attributes in a hypothetical market;
- (g) automatically joining buyers' requests in a consortium by steps comprising:
  - (i) forming the best partition of the buyers' requests into groups or singletons of requests whose representation of attributes can be satisfied by the same seller offering;
  - (ii) forming the combined abstract representation of the requests for the consortium, said representation which will satisfy each buyer in the consortium;
  - (iii) constructing an artificial negotiating entity that will represent at least one consortium, and can conceal the identities of the buyers in the consortium;
- (h) optionally executing at least one market transaction; and
- (i) optionally signaling that the quantities and identities of assignments committed by the market transaction.

54. The method of claim 53, further comprising a microprocessor or virtual machine representing a buyer's preference for commitment or review with respect to the specification of at least one market protocol.

55. The method of claim 53, further comprising a microprocessor or virtual machine representing a seller's preference for commitment or review with respect to the specification of at least one market protocol.

56. The method of claim 53, further comprising a microprocessor or virtual machine representing a buyer's or seller's specification of at least one market protocol wherein the specification of the market protocol includes at least one protocol selected from the group consisting of: reviewed market clearing, committed market clearing, reviewed auction, reviewed descending price auction, reviewed ascending price auction, reviewed English auction, reviewed Dutch auction, reviewed Vikery auction, committed auction, committed descending price auction, committed ascending price auction, committed English auction, committed Dutch auction, and committed Vikery auction.

* * * * *